US012273312B2

(12) United States Patent
Prabhu

(10) Patent No.: US 12,273,312 B2
(45) Date of Patent: *Apr. 8, 2025

(54) SYSTEMS AND METHODS FOR DETECTING OFFENSIVE CONTENT IN A SINGLE RESPONSIVE MESSAGE

(71) Applicant: Trisha N. Prabhu, Naperville, IL (US)

(72) Inventor: Trisha N. Prabhu, Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/622,061

(22) Filed: Mar. 29, 2024

(65) Prior Publication Data
US 2024/0244021 A1    Jul. 18, 2024

Related U.S. Application Data

(63) Continuation of application No. 17/900,866, filed on Aug. 31, 2022, which is a continuation-in-part of application No. 17/393,540, filed on Aug. 4, 2021, now Pat. No. 11,706,176, which is a continuation of application No. 16/372,140, filed on Apr. 1, 2019, (Continued)

(51) Int. Cl.
| | |
|---|---|
| *H04L 51/063* | (2022.01) |
| *G06F 3/04817* | (2022.01) |
| *G06F 3/04842* | (2022.01) |
| *H04L 51/046* | (2022.01) |

(Continued)

(52) U.S. Cl.
CPC ........ *H04L 51/212* (2022.05); *G06F 3/04817* (2013.01); *G06F 3/04842* (2013.01); *H04L 51/046* (2013.01); *H04L 51/063* (2013.01); *H04L 51/52* (2022.05)

(58) Field of Classification Search
CPC ... H04L 51/212; H04L 51/046; H04L 51/063; H04L 51/52; G06F 3/04817; G06F 3/04842
See application file for complete search history.

(56) References Cited

U.S. PATENT DOCUMENTS

| | | |
|---|---|---|
| 6,339,784 B1 | 1/2002 | Morris et al. |
| 7,216,144 B1 | 5/2007 | Morris et al. |

(Continued)

FOREIGN PATENT DOCUMENTS

EP    2328309    6/2011

*Primary Examiner* — Aftab N. Khan
(74) *Attorney, Agent, or Firm* — Fish & Richardson P.C.

(57) ABSTRACT

Methods, systems, and computer programs for identifying offensive content. A method can include for each particular responsive message received in response to an initial message: providing the particular responsive message as an input to a machine learning model trained to predict a likelihood that an initial message includes offensive content based on processing of a responsive message received responsive to the initial message, processing the content of the particular responsive message through the machine learning model to generate output data indicating a likelihood that the initial message includes offensive content, and storing the generated output data. The method can further include determining, based on the stored output date for each of the responsive messages, whether the initial message likely includes offensive content, and based on a determination that the output data for each of the responsive messages indicates that the initial message likely includes offensive content, performing a remedial operation.

20 Claims, 10 Drawing Sheets

Related U.S. Application Data now Pat. No. 11,095,585, which is a continuation of application No. 15/187,674, filed on Jun. 20, 2016, now Pat. No. 10,250,538, which is a continuation-in-part of application No. 14/738,874, filed on Jun. 13, 2015, now Pat. No. 9,686,217.

(60) Provisional application No. 62/012,296, filed on Jun. 14, 2014.

(51) Int. Cl.
*H04L 51/212* (2022.01)
*H04L 51/52* (2022.01)

(56) References Cited

U.S. PATENT DOCUMENTS

| | | | |
|---|---|---|---|
| 7,415,500 B2 | 8/2008 | Morris et al. | |
| 7,613,779 B2 | 11/2009 | Morris et al. | |
| 7,921,369 B2 | 4/2011 | Bill | |
| 8,140,703 B2 | 3/2012 | Morris et al. | |
| 8,443,290 B2 | 5/2013 | Bil | |
| 8,484,333 B2 | 7/2013 | Roskind et al. | |
| 8,838,719 B1 | 9/2014 | Faulk | |
| 9,160,773 B2 | 10/2015 | Bil | |
| 2004/0107089 A1* | 6/2004 | Gross | G06Q 10/107 704/10 |
| 2004/0176944 A1 | 9/2004 | Noda et al. | |
| 2006/0242306 A1 | 10/2006 | Boro et al. | |
| 2006/0282369 A1 | 12/2006 | White | |
| 2007/0233787 A1 | 10/2007 | Pagan | |
| 2008/0082511 A1 | 4/2008 | Williams | |
| 2008/0134282 A1* | 6/2008 | Fridman | G06Q 10/10 726/1 |
| 2008/0172446 A1 | 7/2008 | Donovan | |
| 2008/0307339 A1 | 12/2008 | Boro et al. | |
| 2009/0019121 A1* | 1/2009 | Mears | H04L 51/212 709/206 |
| 2009/0113001 A1 | 4/2009 | Manning et al. | |
| 2009/0254499 A1 | 10/2009 | Deyo | |
| 2010/0175129 A1 | 7/2010 | Doddy et al. | |
| 2010/0280828 A1* | 11/2010 | Fein | G10L 15/1822 704/E15.005 |
| 2011/0092221 A1 | 4/2011 | Zubas et al. | |
| 2011/0145918 A1* | 6/2011 | Jung | G06F 21/52 726/22 |
| 2011/0191105 A1* | 8/2011 | Spears | G06F 40/242 704/251 |
| 2012/0011192 A1* | 1/2012 | Meister | H04L 51/04 709/206 |
| 2012/0246222 A1 | 9/2012 | Martin | |
| 2013/0263181 A1 | 10/2013 | Impollonia et al. | |
| 2013/0278385 A1 | 10/2013 | Baskin et al. | |
| 2013/0340089 A1 | 12/2013 | Steinberg et al. | |
| 2014/0164994 A1 | 6/2014 | Myslinski | |
| 2014/0229557 A1 | 8/2014 | Dietz | |
| 2014/0337438 A1 | 11/2014 | Govande et al. | |
| 2015/0058242 A1* | 2/2015 | Bucciarelli | H04W 4/16 705/325 |
| 2015/0100913 A1* | 4/2015 | Park | G06F 3/0238 715/773 |
| 2015/0180746 A1* | 6/2015 | Day, II | H04L 67/55 455/405 |
| 2015/0278196 A1* | 10/2015 | Dua | G06F 40/9 704/9 |
| 2015/0309987 A1* | 10/2015 | Epstein | G06F 40/30 704/9 |
| 2015/0312649 A1 | 10/2015 | Gopalan et al. | |
| 2016/0098392 A1 | 4/2016 | Clarke et al. | |
| 2016/0104069 A1 | 4/2016 | Garg et al. | |
| 2016/0381533 A1* | 12/2016 | Fogelson | H04W 4/18 455/414.1 |
| 2019/0266444 A1 | 8/2019 | Ryan et al. | |
| 2021/0374360 A1 | 12/2021 | Paul et al. | |

\* cited by examiner

200

OBTAIN, AFTER RECEIPT OF FIRST DATA CORRESPONDING TO MESSAGE CONTENT OF A FIRST MESSAGE THAT WAS TRANSMITTED BY A FIRST USER DEVICE, SECOND DATA CORRESPONDING TO ANOTHER MESSAGE THAT WAS TRANSMITTED AFTER THE FIRST MESSAGE BY A SECOND USER DEVICE 210

DETERMINE, BASED ON THE SECOND DATA, WHETHER THE FIRST DATA CORRESPONDS TO CONTENT THAT IS LIKELY OFFENSIVE 220

IN RESPONSE TO A DETERMINATION, BY ONE OR MORE COMPUTERS, THAT THE FIRST MESSAGE TRANSMITTED BY THE FIRST USER DEVICE LIKELY INCLUDES OFFENSIVE CONTENT, PERFORM A REMEDIAL OPERATION TO MITIGATE EXPOSURE OF OTHER USERS TO THE OFFENSIVE CONTENT 230

OBTAIN FIRST DATA CORRESPONDING TO MESSAGE CONTENT OF A FIRST MESSAGE THAT WAS TRANSMITTED BY A FIRST USER DEVICE  410

GENERATE INPUT DATA FOR INPUT TO A MACHINE LEARNING MODEL BASED ON THE OBTAINED FIRST DATA  420

PROVIDE THE GENERATED INPUT DATA AS AN INPUT TO A MACHINE LEARNING MODEL THAT HAS BEEN TRAINED TO PREDICT A LIKELIHOOD THAT A USER OF A THE FIRST USER DEVICE IS EXHIBITING ONE OR MORE SYMPTOMS OF MENTAL INSTABILITY BASED ON PROCESSING OF INPUT DATA CORRESPONDING TO MESSAGE CONTENT OF A MESSAGE SENT FROM A FIRST USER TO A SECOND USER  430

PROCESS THE PROVIDED INPUT DATA THROUGH EACH LAYER OF THE MACHINE LEARNING MODEL TO GENERATE OUTPUT DATA INDICATING A LIKELIHOOD THAT THE USER OF THE FIRST USER DEVICE IS EXHIBITING ONE OR MORE SYMPTOMS OF MENTAL INSTABILITY  440

DETERMINE WHETHER THE PROVIDED INPUT DATA CORRESPONDING TO THE MESSAGE CONTENT OF THE FIRST MESSAGE IS INDICATIVE OF A USER THAT IS EXHIBIING ONE OR MORE SYMPTOMS OF MENTAL INSTABILITY BASED ON THE GENERATED OUTPUT DATA  450

BASED ON A DETERMINATION THAT THE PROVIDED INPUT DATA CORRESPONDING TO THE MESSAGE CONTENT OF THE FIRST MESSAGE IS INDICATIVE OF ONE OR MORE SYMPTOMS OF MENTAL INSTABILITY, PERFORM A REMEDIAL OPERATION TO MITIGATE EXPOSURE OF OTHER USERS TO THE FIRST MESSAGE CONTENT FROM A USER OF THE FIRST USER DEVICE  460

```
┌─────────────────────────────────────────────┐
│ OBTAIN DATA THAT IDENTIFIES ONE OR MORE     │
│ SYMPTOMS OF MENTAL INSTABILITY ASSOCIATED   │
│ WITH A PARTICULAR ENTITY              510   │
└─────────────────────────────────────────────┘
                      ↓
┌─────────────────────────────────────────────┐
│ ADJUST, BASED ON THE OBTAINED DATA, WEIGHTS │
│ CORRESPONDING TO ONE OR MORE FIELDS OF A    │
│ FEATURE VECTOR REPRESENTING FEATURES        │
│ EXTRACTED FROM USER CONTENT BASED ON THE    │
│ OBTAINED DATA                         520   │
└─────────────────────────────────────────────┘
                      ↓
┌─────────────────────────────────────────────┐
│ PROVIDE THE FEATURE VECTOR AS AN INPUT TO A │
│ MACHINE LEARNING MODEL THAT HAS BEEN        │
│ TRAINED TO DETERMINE A LIKELIHOOD THAT A    │
│ USER IS EXHIBITING ONE OR MORE SYMPTOMS OF  │
│ MENTAL INSTABILITY BASED ON PROCESSING      │
│ USAGE DATA COLLECTED FROM A USER DEVICE OF  │
│ AN ENTITY                             530   │
└─────────────────────────────────────────────┘
                      ↓
┌─────────────────────────────────────────────┐
│ PROCESS THE FEATURE VECTOR THROUGH THE      │
│ MACHINE LEARNING MODEL TO GENERATE OUTPUT   │
│ DATA INDICATING A LIKELIHOOD THAT THE       │
│ PARTICULAR ENTITY IS EXHIBITING ONE OR MORE │
│ SYMPTOMS OF MENTAL INSTABILITY        540   │
└─────────────────────────────────────────────┘
                      ↓
┌─────────────────────────────────────────────┐
│ DETERMINE WHETHER THE PARTICULAR ENTITY IS  │
│ EXHIBITING ONE OR MORE SYMPTOMS OF MENTAL   │
│ INSTABILITY BASED ON THE GENERATED OUTPUT   │
│ DATA                                  550   │
└─────────────────────────────────────────────┘
                      ↓
┌─────────────────────────────────────────────┐
│ BASED ON A DETERMINATION THAT THE           │
│ PARTICULAR ENTITY IS EXHIBITING ONE OR MORE │
│ SYMPTOMS OF MENTAL INSTABILITY, PERFORM ONE │
│ OR MORE OPERATIONS TO MITIGATE THE IMPACT   │
│ OF THE ONE OR MORE SYMPTOMS OF MENTAL       │
│ INSTABILITY ON THE PARTICULAR ENTITY OR     │
│ OTHER ENTITIES                        560   │
└─────────────────────────────────────────────┘
```

OBTAIN DATA REPRESENTING FEATURES OF A SCENE IN A METAVERSE ENVIRONMENT, WHEREIN THE SCENE IN THE METAVERSE ENVIRONMENT INCLUDES (I) ONE OR MORE VISUAL ATTRIBUTES OR (II) ONE OR MORE AUDIO ATTRIBUTES 710

↓

PROVIDE THE OBTAINED DATA AS AN INPUT TO A MACHINE LEARNING MODEL THAT HAS BEEN TRAINED TO PREDICT A LIKELIHOOD THAT DATA REPRESENTING FEATURES OF A SCENE IN A METAVERSE ENVIRONMENT IS INDICATIVE OF OFFENSIVE BEHAVIOR 720

↓

PROCESS THE PROVIDED DATA REPRESENTING FEATURES OF A SCENE IN A METAVERSE ENVIRONMENT THROUGH EACH LAYER OF THE MACHINE LEARNING MODEL TO GENERATE OUTPUT DATA INDICATING A LIKELIHOOD THAT THE REPRESENTING FEATURES OF A SCENE IN A METAVERSE ENVIRONMENT IS INDICATIVE OF OFFENSIVE BEHAVIOR 730

↓

DETERMINE WHETHER THE PROVIDED DATA REPRESENTING FEATURES OF A SCENE IN A METAVERSE ENVIRONMENT IS INDICATIVE OF OFFENSIVE BEHAVIOR BASED ON THE GENERATED OUTPUT DATA 740

↓

BASED ON A DETERMINATION THAT THE PROVIDED DATA REPRESENTING FEATURES OF A SCENE IN A METAVERSE IS INDICATIVE OF OFFENSIVE BEHAVIOR, PERFORM A REMEDIAL OPERATION TO MITIGATE EXPOSURE OF ONE OR MORE USERS TO THE OFFENSIVE BEHAVIOR 750

OBTAIN MULTI-MODAL MESSAGE CONTENT DATA DERIVED FROM INPUT DATA INPUT TO A USER DEVICE BY A USER, WHEREIN THE MULTI-MODAL MESSAGE CONTENT DATA INCLUDES AN IMAGE PORTION AND A TEXT PORTION  *810*

DETERMINE WHETHER THE MULTI-MODEL MESSAGE CONTENT DATA IS LIKELY OFFENSIVE CONTENT COMPRISES: PROVIDE AT LEAST A PORTION OF THE RECEIVED MULTI-MODDAL MESSAGE CONTENT DATA TO A MACHIEN LEARNING MODEL THAT HAS BEEN TRAINED TO DETECT A LIKELIHOOD THAT MULTI-MODAL MESSAGE CONTENT INCLUDING AN IMAGE PORTION AND A TEXT PORTION INCLUDES OFFENSIVE CONTENT BASED ON A COMBINED MEANING ASSOCIATED WITH THE IMAGE PORTION AND THE TEXT PORTION OF THE MULTI-MODAL MESSAGE CONTENT; AND OBTAIN OUTPUT DATA GENERATED BY THE MACHINE LEARNING MODEL BASED ON THE MACHINE LEARNING MODEL PROCESSING THE PROVIDED MULTI-MODEAL MESSAGE CONTET DATA  *820*

IN RESPONSE TO A DETERMINATION, BASED ON THE OBTAINED OUTPUT DATA, THAT THE MULTI-MODAL CONTENT DATA IS LIKELY OFFENSIVE CONTENT, GENERATE ALERT DATA THAT, WHEN PROCESSED BY THE USER DEVICE, CAUSES THE USER DEVICE TO PRESENT AN INDICATION THAT THE MULTI-MODAL MESSAGE CONTENT INCLUDES OFFENSIVE CONTENT  *830*

PROVIDE THE GENERATED ALERT DATA TO THE USER DEVICE  *840*

FIG. 8

SYSTEMS AND METHODS FOR DETECTING OFFENSIVE CONTENT IN A SINGLE RESPONSIVE MESSAGE

CROSS-REFERENCE TO RELATED APPLICATIONS

This application is a continuation of U.S. patent application Ser. No. 17/900,866, filed Aug. 31, 2022, which is a continuation-in-part of U.S. patent application Ser. No. 17/393,540, filed Aug. 4, 2021, now U.S. Pat. No. 11,706,176, issued Jul. 18, 2023, which is a continuation of U.S. patent application Ser. No. 16/372,140, filed Apr. 1, 2019, now U.S. Pat. No. 11,095,585, issued Aug. 17, 2021, which is a continuation of U.S. patent application Ser. No. 15/187,674, filed Jun. 20, 2016, now U.S. Pat. No. 10,250,538, issued Apr. 2, 2019, which is a continuation-in-part of U.S. patent application Ser. No. 14/738,874, filed Jun. 13, 2015, now U.S. Pat. No. 9,686,217, issued Jun. 20, 2017, which claims the benefit of U.S. Provisional Patent Application No. 62/012,296, filed Jun. 14, 2014. The disclosure of each are incorporated herein by reference in their entireties.

BACKGROUND

Electronic messaging systems have enabled instant, and public, sharing messages across many users and communities of users easy. With a click of a button, a user can make content available for towns, cities, states, and even nations to view. Accordingly, when that content includes offensive content, the impact of that offensive content can be wide-ranging.

SUMMARY

According to one innovative aspect of the present disclosure, a method for identifying offensive message content is disclosed. In one aspect, the method can include actions of obtaining, by one or more computers and after receipt of first data corresponding to message content of a first message that was transmitted by a first user device, second data corresponding to another message that was transmitted after the first message by a second user device, determining, by one or more computers and based on the second data, whether the first data corresponds to content that is likely offensive, including: providing, by one or more computers, at least the second data as an input to a machine learning model that has been trained to detect a likelihood that a first message content includes offensive content based message contents of a second message submitted after the first message, obtaining, by one or more computers, output data generated by the machine learning model based on the machine learning model processing the second data, determining, by one or more computers, whether the obtained output data satisfies a predetermined threshold, and in response to determining, by one or more computers and based on the obtained output data, that the first message transmitted by the first user device likely includes offensive content, performing, by one or more computers, a remedial operation to mitigate exposure of other users to the offensive content.

Other aspects include systems and computer programs for performing actions of the aforementioned method.

The innovative method can include other optional features. For example, in some implementations, the first message content is content of an initial social media post, and the other message content is content of a comment on the initial social media post.

In some implementations, the first message content is content of a message received from a messaging application of the first user device, and the other message content is content of a message received from a messaging application of the second user device in response to the first message content.

In some implementations, the method can further include adjusting, by the one or more computers, the output data based on a reputation score associated with a user of the second user device that submitted the other message.

In some implementations, the reputation score can represent a likelihood that the other message submitted by the user of the second user device can be trusted to indicate that the first message content is likely offensive.

In some implementations, performing, by one or more computers, a remedial operation to mitigate exposure of other users to the offensive content can include generating, using one or more computers, notification data that, when processed by the first user device, causes the first user device to prompt a user of the first user device to indicate whether the user wants to delete the first message content or not delete the first message content.

In some implementations, the method can further include receiving, using one or more computers, data corresponding to an indication that the user of the first user device wants to delete the first message content, and in response to receiving data corresponding to an indication that the user of the first user device wants to delete the first message content, deleting, using one or more computers, the first message, wherein deletion of the first message content prohibits any other user from viewing the first message content after its deletion.

In some implementations, performing, by one or more computers, a remedial operation to mitigate exposure of other users to the offensive content can include deleting, using one or more computers, the first message, wherein deletion of the first message content prohibits any other user from viewing the first message content after its deletion.

In some implementations, performing, by one or more computers, a remedial operation to mitigate exposure of other users to the offensive content can include flagging, using one or more computers, the first message for deletion.

In some implementations, performing, by one or more computers, a remedial operation to mitigate exposure of other users to the offensive content can include adjusting, using one or more computers, a content score associated with the first message content, wherein the adjusted content scores causes the first message content to be demoted in list of content items.

In some implementations, performing, by one or more computers, a remedial operation to mitigate exposure of other users to the offensive content can include storing, using one or more computers, the content of the first message in a database of offensive content used to screen messages or other content for offensive content.

In some implementations, performing, by one or more computers, a remedial operation to mitigate exposure of other users to the offensive content can include training, using one or more computers, a machine learning model to detect subsequent messages that include the first message content as offensive content.

In some implementations, performing, by one or more computers, a remedial operation to mitigate exposure of other users to the offensive content can include causing, using one or more computers, a warning message to be displayed in proximity to the first message content within a messaging application.

In some implementations, the machine learning model can include one or more neural networks.

According to another innovative aspect of the present disclosure, a method for identifying offensive message content is disclosed. In one aspect, the method can include actions of for each particular responsive message of a plurality of responsive messages received in response to an initial message: providing, by one or more computers, content of the particular responsive message as an input to a machine learning model that has been trained to predict a likelihood that an initial message provided by a first user device includes offensive content based on processing of responsive message content from a different user device provided in response to the initial message, processing, by the one or more computers, the content of the particular responsive message through the machine learning model to generate output data indicating a likelihood that the initial message includes offensive content, and storing, by the one or more computers, the generated output data, determining, by the one or more computers and based on the output data generated for each of the plurality of responsive messages, whether the initial message likely includes offensive content, and based on a determination, by the one or more computers, that the output data generated for each of the plurality of responsive messages indicates that the initial message likely includes offensive content, performing, by one or more computers, a remedial operation to mitigate exposure to the offensive content.

Other aspects include systems and computer programs for performing actions of the aforementioned method.

The innovative method can include other optional features. For example, in some implementations, determining, by the one or more computers and based on the output data generated for each of the plurality of responsive messages, whether the initial message likely includes offensive content can include for each particular instance of output data generated for a responsive message: determining, by the one or more computers, whether the particular instance of output data satisfies a predetermined threshold, and incrementing one of a plurality of counters based on the determination as to whether the particular instance of output data satisfies a predetermined threshold. In such implementations, incrementing one of the plurality of counters based on the determination can include incrementing a first counter corresponding to a first determination that the particular responsive message indicates that the initial message is likely offensive, or incrementing a second counter corresponding to a second determination that the particular responsive message indicates that the initial message is not likely offensive.

In some implementations, determining, by the one or more computers and based on the output data generated for each of the plurality of responsive messages, whether the initial message likely includes offensive content further can include determining, by the one or more computers, that the initial message likely includes offensive content if the first counter is greater than the second counter.

In some implementations, determining, by the one or more computers and based on the output data generated for each of the plurality of responsive messages, whether the initial message likely includes offensive content can include determining, by the one or more computers, that the initial message likely includes offensive content if the first counter is greater than the second counter after evaluation of a threshold number of responsive messages.

In some implementations, determining, by the one or more computers and based on the output data generated for each of the plurality of responsive messages, whether the initial message likely includes offensive content further can include determining, by the one or more computers, that the initial message likely includes offensive content if the first counter satisfies a predetermined threshold number of occurrences.

In some implementations, determining, by the one or more computers and based on the output data generated for each of the plurality of responsive messages, whether the initial message likely includes offensive content can include determining, by the one or more computers, that the initial message likely does not include offensive content if the second counter is greater than the first counter.

In some implementations, determining, by the one or more computers and based on the output data generated for each of the plurality of responsive messages, whether the initial message likely includes offensive content can include determining, by the one or more computers, that the initial message likely does not include offensive content if the second counter is greater than the first counter after evaluation of a threshold number of responsive messages.

In some implementations, determining, by the one or more computers and based on the output data generated for each of the plurality of responsive messages, whether the initial message likely includes offensive content can include determining, by the one or more computers, that the initial message likely does not include offensive content if the second counter satisfies a predetermined threshold number of occurrences.

In some implementations, determining, by the one or more computers and based on the output data generated for each of the plurality of responsive messages, whether the initial message likely includes offensive content can include determining, by the one or more computers, that the first counter and the second counter are equal, and based on a determination, by the one or more computers, that the first counter and the second counter are equal, determining, by the one or more computers, whether the initial message likely includes offensive content based on one or more of a number of likes associated with the initial message, a number of different types of emojis associated with the initial message, or a number of comments associated with the initial message.

In some implementations, performing, by one or more computers, a remedial operation to mitigate exposure to the offensive content can include generating, using one or more computers, notification data that, when processed by the first user device, causes the first user device to prompt a user of the first user device to indicate whether the user wants to delete the initial message content or not delete the initial message content.

In some implementations, receiving, using one or more computers, data corresponding to an indication that the user of the first user device wants to delete the initial message content, and in response to receiving data corresponding to an indication that the user of the first user device wants to delete the initial message content, deleting, using one or more computers, the initial message, wherein deletion of the initial message content prohibits any other user from viewing the first message content after its deletion.

In some implementations, performing, by one or more computers, a remedial operation to mitigate exposure to the offensive content can include deleting, using one or more computers, the initial message, wherein deletion of the initial message content prohibits any other user from viewing the initial message content after its deletion.

In some implementations, performing, by one or more computers, a remedial operation to mitigate exposure to the offensive content can include flagging, using one or more computers, the initial message for deletion.

In some implementations, performing, by one or more computers, a remedial operation to mitigate exposure to the offensive content can include adjusting, using one or more computers, a content score associated with the initial message content, wherein the adjusted content scores causes the initial message content to be demoted in list of content items.

In some implementations, performing, by one or more computers, a remedial operation to mitigate exposure to the offensive content can include storing, using one or more computers, the content of the initial message in a database of offensive content used to screen messages or other content for offensive content.

In some implementations, performing, by one or more computers, a remedial operation to mitigate exposure to the offensive content can include training, using one or more computers, a machine learning model to detect subsequent messages that have the initial message content as offensive content.

In some implementations, performing, by one or more computers, a remedial operation to mitigate exposure to the offensive content can include causing, using one or more computers, a warning message to be displayed in proximity to the initial message content within a messaging application.

According to another innovative aspect of the present disclosure a method for mitigating distribution of offensive content based on a user of the user device exhibiting one or more forms of mental instability is disclosed. In one aspect, the method can include actions of obtaining, by one or more computers, first data corresponding to message content of a first message that was transmitted by a first user device, generating, by the one or more computers, input data for input to a machine learning model based on the obtained first data, providing, by the one or more computers, the generated input data as an input to a machine learning model, wherein the machine learning model has been trained to predict a likelihood that a user of the first user device is exhibiting one or more forms of mental instability based on processing of input data corresponding to message content of a message set from a first user to a second user, processing, by the one or more computers, the provided first data through each layer of the machine learning model to generate output data indicating a likelihood that the user of the first user device is exhibiting one or more forms of mental instability, and determining, using one or more computers, whether the provided input data corresponding to the message content of the first message is indicative of a user that is exhibiting one or more forms of mental instability based on the generated output data, and based on a determination that the provided input data corresponding to the message content of the first message is indicative of one or more forms of mental instability, performing, using one or more computers, a remedial operation to mitigate exposure of other users to the message content from a user of the first user device.

Other aspects include systems and computer programs for performing actions of the aforementioned method.

The innovative method can include other optional features. For example, in some implementations, performing, using one or more computers, a remedial operation to mitigate exposure of other users to the message content from a user of the first user device can include generating, using one or more computers, notification data for transmission to the first user device that, when processed by the first user device, prompts the particular user to reconsider instructing the first user device to communicate subsequent message content to another user device.

In some implementations, performing, using one or more computers, a remedial operation to mitigate exposure of other users to the message content from a user of the first user device can include providing, using one or more computers, second data corresponding to subsequent message content from the first user device for content screening prior to output of the subsequent message content by a second user device, determining, using one or more computers, whether the provided second data includes offensive content, and only after a determination that the provided second data includes offensive content, generating, using one or more computers, notification data for transmission to the first user device that, when processed by the first user device, prompts the particular user to reconsider instructing the first user device to communicate subsequent message content to another user device.

In some implementations, performing, using one or more computers, a remedial operation to mitigate exposure of other users to the message content from a user of the first user device can include providing, using one or more computers, second data corresponding to subsequent message content from the first user device for content screening prior to output of the subsequent message content by a second user device, determining, using one or more computers, whether the provided second data includes offensive content, and only after a determination that the provided second data includes offensive content, prohibiting, output of a message including the subsequent message content on the second user device.

In some implementations, performing, using one or more computers, a remedial operation to mitigate exposure of other users to the message content from a user of the first user device can include generating, using one or more computers, notification data for transmission to the first user device that, when processed by the first user device, (i) notifies the user of the first device that one or more forms of mental instability have been detected and (ii) prompts the particular user to consult one or more resources for treating the one or more symptoms.

In some implementations, the one or more resources can include an emergency contact, a health professional, law enforcement, or one or more links to network resources.

In some implementations, the machine learning model can include one or more neural networks.

According to another innovative aspect of the present disclosure, a method of mitigating cyberbullying behavior in a metaverse environment is disclosed. In one aspect, the method can include obtaining, using one or more computers, data representing features of a scene in a metaverse environment, where the scene in the metaverse environment includes (i) one or more visual attributes or (ii) one or more audio attributes, providing, using one or more computers, the obtained data as an input to a machine learning model that has been trained to predict a likelihood that data representing features of a scene in a metaverse environment is indicative of offensive behavior, processing, using one or more computers, the provided data representing features of a scene in a metaverse environment through each layer of the machine learning model to generate output data indicating a likelihood that the representing features of a scene in a metaverse environment is indicative of offensive behavior, determining, using one or more computers, whether the provided data representing features of a scene in a metaverse environment is indicative of offensive behavior based on the generated output data, and based on a determination that the provided data representing features of a scene in a metaverse is indicative of offensive behavior, performing, using one or more computers, a remedial operation to mitigate exposure of one or more users to the offensive behavior.

Other aspects include systems and computer programs for performing actions of the aforementioned method.

The innovative method can include other optional features. For example, in some implementations, performing a remedial operation to mitigate exposure of other users to the offensive behavior can include determining, using one or more computers, a particular user in a metaverse scene that initiated the offensive behavior, and generating, using one or more computers, notification data for transmission to a user device of the particular user that, when processed by the user device of the particular user, prompts the particular user to stop the offensive behavior.

In some implementations, the notification data, when processed by the user device of the particular user, causes the user device to display a visual notification in the display of the user device that prompts the particular user to stop the offensive behavior.

In some implementations, the notification data, when processed by the user device of the particular user, causes the user device to output an audio notification from one or more speakers of the user device that prompts the particular user to stop the offensive behavior.

In some implementations, performing a remedial operation to mitigate exposure of other user to the offensive behavior can include determining, using one or more computers, a particular user in a metaverse scene that initiated the offensive behavior, and muting, using one or more computers, audio from an avatar corresponding to the particular user in the metaverse environment.

In some implementations, performing a remedial operation to mitigate exposure of other user to the offensive behavior can include determining, using one or more computers, a particular user in a metaverse scene that initiated the offensive behavior, and obfuscating, using one or more computers, a visual representation of an avatar corresponding to the particular user in the metaverse environment.

In some implementations, performing a remedial operation to mitigate exposure of other user to the offensive behavior can include determining, using one or more computers, a particular user in a metaverse scene that initiated the offensive behavior, and removing, using one or more computers, a visual representation of an avatar corresponding to the particular user from the metaverse environment.

In some implementations, the machine learning model can include one or more neural networks.

BRIEF DESCRIPTION OF THE DRAWINGS

FIG. 2 is a flowchart of an example of a process for mitigating spread of offensive content via a communication system based on a responsive message.

FIG. 4 is a flowchart of an example of a process for detecting that a user is exhibiting symptoms of mental instability and performing one or more mitigating operations.

FIG. 5 is a flowchart of an example of a process for dynamic feature weighting in a system for detecting that a user is exhibiting symptoms of mental instability.

FIG. 7 is a flowchart of an example of a process for mitigating offensive behavior in a metaverse environment.

FIG. 8 is a flowchart of an example of a process for mitigating the spread of offensive messages comprising multi-modal content.

DETAILED DESCRIPTION

Figure 1:
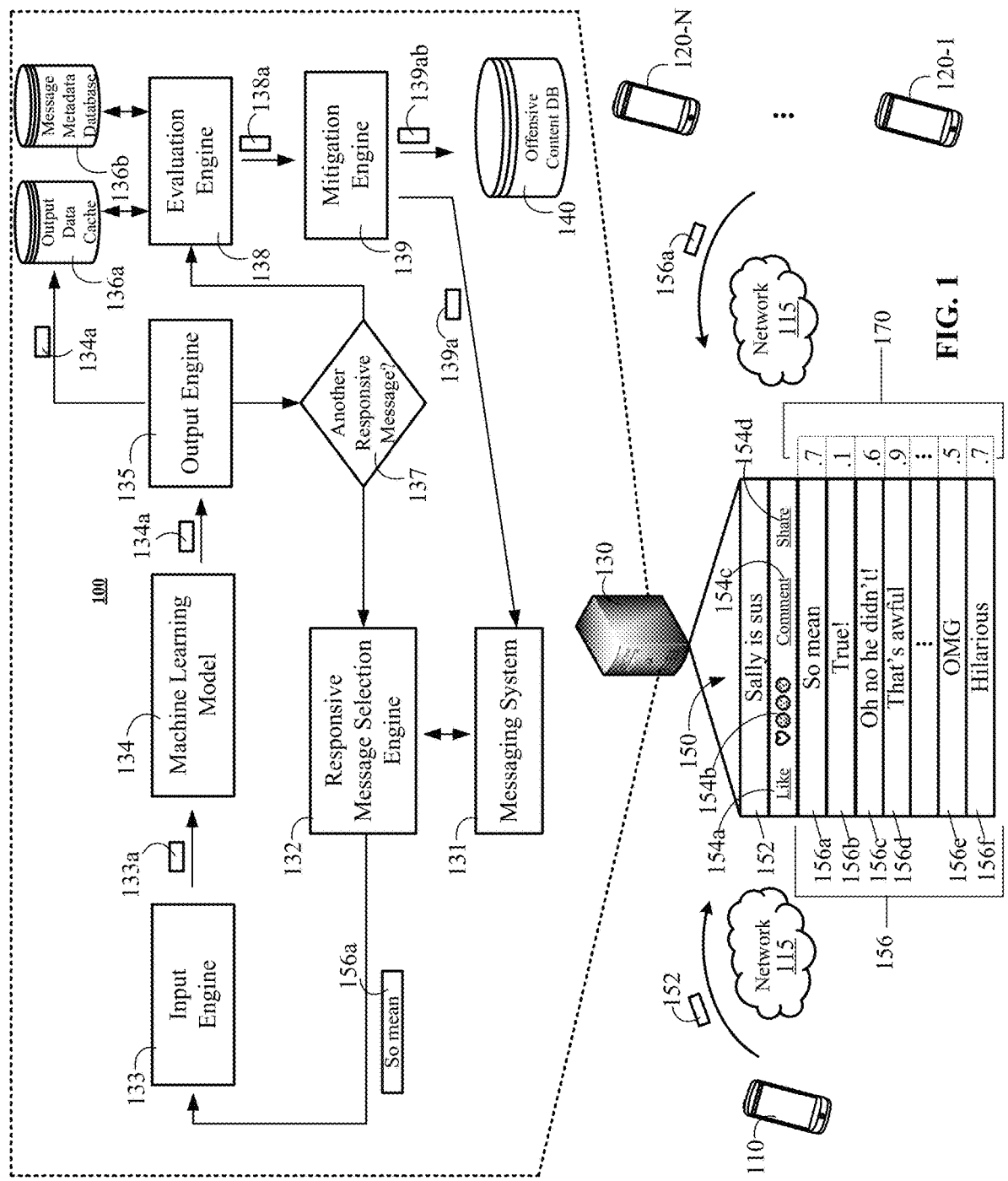
FIG. 1 is a diagram of an example of a system for mitigating spread of offensive content via a communication system based on one or more responsive messages.

The present disclosure is directed towards systems, methods, and computer programs for mitigating offensive behavior. Mitigating offensive behavior includes performing one or more operations in order to reduce spread of messages, gestures, or both, that are likely to be offensive to others. Such messages can be communicated in a variety of different communication platforms including messaging applications, social media platforms, metaverse environments, or any combination thereof.

In some implementations, the present disclosure facilitates indirect detection of offensive behavior. Indirect detection of offensive behavior can include, for example, detection of an offensive message based on an analysis of something other than the candidate behavior that is actually being evaluated for having a potentially offensive nature. An example of indirect detection of offensive behavior can include, for example, a determining based on an evaluation of a responsive message that a prior message, which preceded or prompted the responsive message included offensive content. In one implementation, for example, a responsive message can include a comment on an already existing social media post, with the existing social media post being the prior message. Though distinctions are made here between a comment and a social media post in order to provide an easily understood example, it should be understood that that an already existing social media post can be a comment, itself. In such instances, responsive message can include, for example, a comment submitted in response to the existing comment. Accordingly, as used herein, a social media post may refer to as any content submitted to a social media message platform including a social media post, a comment on a social media post, a comment of a comment to a social media post, or any combination thereof. A social media post can include any types of content include, for example, text content, audio content, image content, video content, or any combination thereof. In some instances, the social media post can include a URL linking to content that is not fully displayed within the social media post itself.

In some implementations, the message metadata related to a prior social media post can also be used to indirectly determine whether the initial message of a social media post includes offensive content. For example, in such implementations, the message metadata can include likes, dislikes, emojis, a ratio of likes to comments, a ratio of emojis to comments, a reputational score of a user that submitted a responsive message or other message metadata, or any combination thereof associated with an existing social media post. Accordingly, by way of another exemplary implementation, indirect detection of offensive behavior can include, for example, determining based on an evaluation of likes associated with a social media post, an evaluation of dislikes associated with a social media post, an evaluation of emojis associated with a social media post, an evaluation of a ratio of likes to comments associated with a social media post, an evaluation of a ratio of emojis to comments associated with a social media post, or an evaluation of any combination thereof, that a social media post includes offensive content.

However, the present disclosure related to indirect detection of offensive behavior is not limited to use on social media platforms. Instead, the techniques of the present disclosure related to indirect detection of offensive behavior can be implemented in any electronic message applications include, for example, instant messaging applications, text messaging applications, multimedia messaging applications, or the like.

Accordingly, comments, or other responsive messages, provided after or in response to a preceding message such as a social media post can be used as a signal to determine whether or not the preceding message includes offensive content. Detecting offensive content based on responsive messages is a powerful process that solves problems in the technological field of detecting offensive content, as described in more detail below.

One of the primary problems that exists in detecting offensive content is that a computer system must first identify what offensive content looks like in order to detect it and mitigate its spread. However, this can be challenging task for a number of reasons including, for example, the fact that slang language, pop culture, or both, may evolve faster than computerized definitions of language terms, databases of training data, or both. That is, society may develop new terms, or use existing terms in a different way, in order to convey an offensive message. For example, the term "square" is a term that describes a shape having four sides of equal length. However, in the 1940s, the terms "square" evolved to be used in a derogatory manner to describe someone as conventional or old-fashioned. Accordingly, there was a period in time that existed between when the term "square" only described a shape and when the term "square" become a trendy way to offensively call a person conventional or old-fashioned. And, though there were not systems available in the 1940s when such evolution took place, had computer systems for detecting offensive content been prevalent, such computing systems would not have been able to identify messages such as "you are such a square" as offensive content without first being programmed or trained to detect "square" as an offensive term.

The aforementioned example is a simple example from another era that highlights the problem that exists in evolving languages. Nonetheless, every generation derives their own slang terms that can be used has hurtful insults. Other terms or phrases that evolved to have a negative connotation over the years have included, for example, "talk to the hand," "scrub," "NOT" (e.g., you are beautiful. NOT!), "basic," "noob," or "boomer." While each of these words or phrases have been used, during some time period, at least some have gone through a period of time where they had another, non-offensive, meaning or no meaning at all. Instead, it was not until the use of the word or phrase took hold over a period of time and began to trend, that the word or phrase was even identified as hurtful at all. And, during this time, messages that included such content could not have been identified as offensive using conventional technology.

The present disclosure solves this problem by analyzing responsive messages, message metadata, or both, to determine if the responsive message provides an indication that the initial message to which the responsive message is responding too is offensive. In some implementations, this can be achieved by training a machine learning model to infer, based on the content of a responsive message such as a social media content, whether the initial message is offensive. However, as indicated above, the present disclosure is not so limited to the content of a comment. For example, in some implementations indirect detection of offensive content can include evaluation of other message metadata such as a ratio of likes to responsive messages can be considered to determine whether an initial message is potentially offensive. Alternatively, or in addition, indirect determinations as to whether a responsive message indicates that an initial message includes offensive content can be weighted based on one or more scores or weights such as, for example, a reputational score of a user that submitted the responsive message.

Another form of indirect detection of offensive content can include performing one or more operations to mitigate spread of messages from a user that has been determined to exhibit one or more forms of mental instability. Such operations are indirect detection of offensive content because one or more mitigation operations triggered based on a determination that the user has one or more forms of mental instability (e.g., depression, suicidal thoughts, feelings of hopelessness, etc.) and not based on the content of a message alone. Mental instability can include any mental, mood disorder, or emotional illness including, but not limited to, for example, depression, suicidal thoughts, bi-polar disorder, or the like. A symptom of mental instability can include any attribute associated with the user, the user's user of a device, or a combination thereof, that provides an indication that the user may be associated with mental instability. Upon detection of such symptoms, one or more operations can be activated to mitigate spread of messages from such a user, as a user suffering from such mental instability may be more likely to express hurtful thoughts towards others.

In other implementations, aspects of the present disclosure can be used to mitigate the spread of offensive content in a metaverse environment. In such implementations, the present disclosure is configured to capture features of a scene in a metaverse environment and determine, based on the scene of the metaverse environment, whether the metaverse scene includes any offensive behavior. A scene of a metaverse environment can include a snapshot of a metaverse environment at any particular point in time or period of time. A snapshot of a metaverse environment at a particular point in time may include, e.g., a display capture of each of the avatar's falling within a displayed portion of the metaverse at the particular point in time. A snapshot of a metaverse environment of a particular period of time can include, e.g., a capture of one or more images, video, audio, textual messages, or any combination thereof, that were displayed, output, or sent during the particular period of time. Upon detection of a metaverse scene that includes offensive behavior, the present disclosure can perform one or more operations to mitigate spread of the offensive behavior such as, for example, obfuscating the offensive avatar, muting the offensive avatar, deleting the offensive avatar from the metaverse environment, or any combination thereof.

FIG. 1 is a diagram of an example of a system 100 for mitigating spread of offensive content via a communication system based on one or more responsive messages. The system 100 can include multiple user devices 110 and 120-1 to 120-N, a network 115, and an application server 130, where N is any positive integer greater than 1.

The user device 110 is configured to communicate with the application server 130, the user device 120, or a combination of both. In some implementations, a user device 110 communicating with the application server 110 can include the user device 110 submitting a message 152 to a message system 131 that is hosted by the application server 130. The messaging system 131 can include, for example, social network service that provides social media profiles, newsfeeds, direct messaging, or any combination thereof. Each user device 110, to avail themselves of the services office by the message system 131, can install a mobile application that provides an interface for interacting with the messaging system 131. Using the mobile application, each user device 110, 120-1, 120-N can submit social media posts, view social media posts, comment on social media posts, transmit and receives direct messages, or any combination thereof, using the mobile application. In some implementations, such services of a message system 131 can also be accessed by the user device 110, 120-1, 120-N via a web browser. For purposes of this disclosure, a user device can be a smartphone, a tablet, a laptop, a desktop, a smartwatch, a vehicle onboard entertainment system, a smart TV, a gaming console, or any other computing device that enables a user to communication with the message system 131 hosted by the application server 130.

However, there is no requirement that the message system 131 be a social network service. Instead, in some implementations, the message system 131 may merely facilitate message between the user devices 110 and one or more other user device 120-1 to 120-N. Such messaging services can include any text messages services, multimedia messaging services, or both. These can include SMS message system, MMS messaging systems, or other messaging systems facilitating text message, picture messaging, video messaging, or multimedia messaging outside of the SMS or MMS messaging systems. Such messaging services can include, for example, messaging services such as Apple's iMessage, Facebook's Whatsapp, or the like.

Though the message system 131 of system 100 is shown on a single application server with other aspects of the present disclosure such as the responsive message selection engine 132, the input engine 133, machine learning model 134, output engine 15, output data cache 136a, message metadata database 136b, decisioning engine 137, evaluation engine 138, mitigation engine 139, and offensive content database 140 the present disclosure is not so limited. For example, in some implementations, the application server 130 can be comprised of multiple networked computers with the messaging system 131, other aspects of the present disclosure 132-140 described above may be distributed across the multiple computers. In yet other implementations, the messaging system 131 may be merely an API that is configured to allow the other aspects of the present disclosure such as the responsive message selection engine to access responsive messages submitted via the messaging system 131.

In some implementations, the user device 110 communicating with the user device 120 can include the user device 110 providing a message 152 that is received by the messaging system 131 of the application server 130 via the network 115. Then, the messaging system 131 of the application server 130 can make the content of the message 152 available for viewing the one or more of the other user devices 120-1 to 120-N. The network 115 can include one or more wired or wireless networks include an Ethernet network, a LAN, a WAN, a WiFi network, the Internet, a cellular communications network, a Bluetooth network, other similar networks, or any combination thereof.

In some implementations, the messaging system 131 can post the message via a social media network. This can include, for example, posting the message 152 on a social media profile of the user of 110, posting the message 152 in a newsfeed of a social media network, posting the message 152 as a comment in response to another social media post, a combination thereof, or the like. Then, a user of one or more other second user devices 120-1 to 120-N can view the message 152 via the social media profile, the news feed, comment on another social media post, a combination thereof, or the like.

In other implementations, the message system 131 can determine that the message 152 is addressed to one or particular user devices 120-1 to 120-N and then transmit the message 152 to those particular user devices. This can happen in the context of instance message systems, SMS messaging systems, MMS messaging systems, direct messaging systems of a social media network, non-SMS or non MMS messaging services (e.g., iMessage, What's App, or the like) or the like.

In the example of the system 100 of FIG. 1, a social networking implementation is described. The application server 130 can include a messaging system 131, a responsive message selection engine 132, an input engine 133, a machine learning model 134, an output engine 15, an output data cache 136a, a message metadata database 136b, a decisioning engine 137, an evaluation engine 138, a mitigation engine 139, and an offensive content database 140. For purposes of the present disclosure, each of these components such as an engine, a cache, a database, or a model can be implemented using one or more software modules, one or more hardware modules, or any combination thereof. And, though depicted within a single server in FIG. 1, it is readily understood that the application server 130 can, in some implementations, be comprised of multiple networked computers with each of the aforementioned engines, models, caches, or databases being distributed among the multiple computers.

In the example of FIG. 1, a user of the user device 110 enters message content "Sally is sus" 152 into the user device and causes the user device 110 to transmit the message content 152 to the application server 130 via the network 115. The messaging system 132 of the application server 130 receives the message content 152 and causes the message content 152 to be available for viewing by one or more other user devices 120-1 to 120-N. In the example of FIG. 1, the messaging system 131 causes the message content 152 to be available for viewing by one or more other user devices 120-1 to 120-N by posting the message content 152 to one or more social media pages such as, for example, a social media profile associated with the user of user device 110, a social media news feed, or both. For example, the messaging system can create a social media post 150 based on the received message content 152.

The social media post 150 (or post 150), which can be viewed on a display of one or more user devices 110, 120-1 to 120-N can include the message content "Sally is sus" 152.

The social media post 150 can also include a selectable like icon 154a, a selectable emoji icon 154b, a comment link 154c, a share link 154d, or any combination there. The like icon 154a can be selected by a user of a user device viewing the social media post 150 as an indication that the user likes the post 150. In some implementations, the post 150 can also display a number of likes. The emoji icon 154b can be selected by a user of a user device viewing the post 150, and responsive to the selection, one or more emojis may be displayed, with each emoji including a graphical face corresponding to a human emotion such as happy, sad, angry, shocked, or the like. In some implementations, the post 150 can also display a number of times each emoji has been selected. The comment link 154c can be selected by a user of a user device in order to access a message box that enables the user that selected the comment link to post a comment responding to the content "Sally is sus" 152 of the post 150. In some implementations, the post may not include a comment link and instead just include a message box in proximity to the content "Sally is Sus" 152 that enables a user of a user device viewing the post to select the message box and enter a comment. The share link 154d can be selected by a user of a user device viewing the social media post 150 and enable the selecting user to share the post 150. Sharing the post may automatically re-post the post 150 to a social media profile page associated with the selecting user, copy a URL to the post 150 that the selecting user can paste elsewhere, or any combination thereof. In some implementations, different sharing selectable links or icons can be provided giving a user viewing the post a first link for re-posting the post 150 and a second link for copying a URL that references the post 150 for pasting elsewhere.

After the content "Sally is sus" 152 is posted as post 150, users of the same user device 110 or other user devices 120-1 to 120-N can have the opportunity to view the post 150 content 152, like the post 150 content 152, select an emoji describing their emotions towards the post 150 content 152, comment on the post 150 content 152, share the post 150 content 152, or any combination thereof. In the example of FIG. 1, a plurality of comments 156 are submitted by users of one or more user devices 120-1 to 120-N. These comments 156, which are an example of responsive messages, include "So mean" 156a, "True" 156b, "Oh no he didn't" 156c, "That's awful" 156d, "OMG" 156e, and "hilarious" 156f.

In the example of FIG. 1, it is assumed that the term "sus" is an example of an adjective that is not known to the existing offensive content database 140 at the time of the posting of content 152 as being indicative of an offensive term. As a result, conventional content filtering systems would not be able to detect such content as offensive content. However, for purposes of this example, it is assumed that a cutting trend is to use the term "sus" as shorthand slang for "suspicious" or "suspect" and convey the meaning that the entity described by the term, in this case Sally, is an entity that should not be trusted.

The specific term "sus" is being provided here as a term that is new or trendy and whose offensive meaning may not have been immediately part of content screening keywords upon its first use. However, the term "sus" is merely an example and is not in any way limiting. Nor, is it a deficiency if the term "sus" was determined to be defined and used in content screening mechanisms prior to the time of this disclosure. Instead, the term "sus" is being used as a creative and easy to understand example of how the technology of the present disclosure can be used to detect offensive content in an initial message, as of the time of the viewing of the initial message, would not have been known to content screening applications due to a variety of reasons including, for example, the terms new, trendy, and/or out of context use. In such implementations, responsive messages submitted after and/or in response to the initial message, message metadata, or both, can be used to essentially crowdsource the meaning of the initial message content to determine whether the initial message content is offensive using the techniques described herein.

The responsive message selection engine 132 is configured to obtain data that is submitted as a responsive to the post 150 content 152. Such obtained data can include responsive messages, message metadata, or both, from a messaging system 131. Responsive messages can include any data submitted by a second user of a second device, e.g., user device 120-1, after or in response to an initial message submitted by a first user of a first device, e.g., user device 110. In some implementations, for example, a responsive message can include a comment on a social post, a comment on a comment on a social media post, a response to a message in a messaging environment or direct messaging environment, the like, or any combination thereof. The responsive message selection engine 132 provide an obtained responsive message to the input engine 133. Message metadata can include any data other than a responsive message submitted or obtained after or in response to an initial message. In some implementations, for example, message metadata can include a like of a social media post, a number of likes of social media post, a number of dislikes on a social media post, an emoji selected on a social media post, a number of each type of emoji selected on a social media post, a number of comments on a social media post, a ratio of likes to comments on a social media post, a ration of emoji type to comments on a social media post, a like/dislike/love/emphasis/question or other tapback indication (or equivalent) on a message in an messaging environment or direct messaging environment, a number of likes/dislikes/loves/emphasis/questions or other tapback indication (or equivalent) on a message in an messaging environment or direct messaging environment, a type of emoji provided after or as a response to an initial message in a messaging environment or direct messaging environment, a number each emoji type provided after or as a response to an initial message in a messaging environment or direct messaging environment, reputational score of a person that submitted a responsive message or message metadata, the like, or a combination thereof.

As the responsive message selection engine 132 obtains data submitted in response to the post 150 content 152, the responsive message selection engine 132 can determine whether the obtained is a responsive message, message metadata, or both. If the responsive message selection engine 132 obtains a responsive message without an associated reputation score, the responsive message selection engine 132 provides the obtained responsive message as an input to the input engine 133. If the responsive message selection engine 132 obtains a responsive message with an associated reputation score, the responsive message selection engine 132 can provide the responsive message as an input to the input engine 133 and store the associated reputation score in a message metadata database 136b. The system 100 can then obtain the reputation score from the message metadata database 136b using the evaluation engine to increase or decrease output data generated by the machine learning model 134 for the message associated with reputation score. In some implementations, to facilitate association of a responsive message and a reputation score, a user_id or other data can be associated with the responsive message and stored reputation score. In other implementations, all or a portion of the content of the responsive message can be used as an index for the reputation score so that the reputation score can be retrieved by the evaluation engine. In yet other implementations, the system 100 can also obtain a responsive message associated with a reputation score and provide the (i) responsive message and (ii) the reputation score as an input to the input engine, as in some, but not all, implementations, the machine learning model 134 can be trained on input data having both the responsive score and the reputation score.

In some instances, however, the responsive message selection engine 132 may obtain message metadata without an accompanying responsive message. For example, the responsive message selection engine 132 can periodically obtain message metadata for post 150 content 152 corresponding to a number of likes associated with the post 150 content 152, a number of dislikes associated with the post 150 content 152, a number of each type of emojis associated with the post 150 content 152, a number of total comments associated with the post 150 content 152, a number of shares associated with the post 150 content 152, or any combination thereof. When such message metadata is obtained, by the responsive message selection engine 132, the responsive message selection engine 132 stores the obtained message metadata in the message metadata database 136*b*. In some implementations, the responsive message selection engine 132 can obtain the message metadata for post 150 content 152 in real time. In other implementations, the responsive message selection engine 132 can periodically obtain such message metadata for post 150 content 152. For example, in some implementations the responsive message selection engine 132 can obtain message metadata for post 150 content 152 every 2 seconds, every 5 seconds, every minute, every 5 minutes, or the like. In other implementations, the responsive message selection engine 132 can obtain message metadata when a number of occurrences of likes, dislikes, emojis, comments, shares, or any combination thereof, satisfies one or more thresholds. In other implementations, the responsive message selection engine 132 can obtain the message metadata for post 150 content 152 on an as-needed basis. For example, the responsive message selection engine 132 can obtain message metadata for a post 150 content 152 when evaluation engine 138 is unable to determine, based on output data, whether responsive messages indicate that the post 150 content 152 is offensive or not. Such a scenario can arise when, for example, the likely offensive content counters and not likely offensive content counters that may be used by the evaluation engine 138 are equal. When the message metadata is obtained, it is then stored in the message metadata database 136*b*.

The aforementioned description describes the responsive message selection engine 132 as being a single engine that obtains responsive messages without message metadata, responsive messages with message metadata, or message metadata alone. However, the present disclosure is not limited to a single engine that does each of these three operations. Instead, in some implementations, separate engines may be used. For example, in some implementations, a first engine can be used to obtain responsive messages without message metadata and responsive messages with metadata and a second engine can be used to obtain message metadata that is not associated with a particular responsive message. In general, the engines described herein are intended to describe software modules, hardware modules, or a combination thereof, that realize the functionality attributed to the particular engines described herein—without placing constraints on logical or physical implementations of such modules.

Continuing with the example of FIG. 1, the responsive message selection engine 132 can obtain a first responsive message "So mean" 156*a* and provide the responsive message 156*a* as an input to the input engine 133. In an optional implementation, the responsive message selection engine 132 may also determine that the user that submitted the first responsive message "So mean" 156*a* has a reputational score of 0.7 and store the reputational score 0.7 in the message metadata database 136*b* along with an index that associates the reputational score with the first responsive message 156*a*.

The input engine 133 is configured to receive a responsive message such as the first responsive message 156*a* and generate an input to the machine learning model 134 based on the received responsive message. In some implementations, this may include formatting the responsive message 156*a* into a format that the machine learning model 134 expects to receive. This can include, for example, the input engine 133 performing feature extraction and generating an input vector that numerically represents the content of the responsive message 156*a* based on the extracted features. In some implementations, the vector vocabulary of the input vector may include a field corresponding to known English words, known words, known acronyms, known emojis, known short hand symbols (e.g., ;)), reputation score of the user that submitted the responsive message, an indication of whether all capital letters were used to show emotion or anger, an indication of whether alternating lower case and upper case letters were used to show sarcasm, any subset there, any combination there, or other similar features. In such implementations, the input engine 133 can generate a numerical value for each of the fields of the input vector indicating a level of expression of each corresponding field in the responsive message and then provide the generated input vector as input 133*a* to the machine learning model 134. In other implementations, the input engine 133 may generate a binary representation of the responsive message 156*a* and provide the generated binary representation as the input 133*a* to the machine learning model 134. In other implementations, the input engine 133 may merely make minor formatting changes to the format of the responsive message 156*a* that the input engine 133 receives such as, e.g., removal, addition, or modification of fields of a data structure that structures the responsive message 156*a* received by the input engine 133 to generate input 133*a* to the machine learning model representing the responsive message 156*a*.

The machine learning model 134 is configured to receive the input data 133*a* that represents one of the responsive messages 156, which in this first iteration of the system 100 corresponds to the first responsive message 156*a*. The machine learning model 134 is a machine learning model that has been trained to predict a likelihood that an initial message provided by a first user device includes offensive content based on processing of responsive message content from a different user device provided in response to the initial message. The machine learning model 134 is configured to process the input data 133*a*, which in this first iteration of system 100 represents the responsive message "So mean" 156*a* to generate output data 134*a* indicating a likelihood that the responsive message "So mean" 156*a* indicates that the initial message, which in this example is "Sally is sus" 152," includes offensive content. The machine learning model 134 can provide the generated output data 134a as an input to the output engine 135.

The machine learning model 134 can include any type of machine learning model that can be trained to generate output data capable of being used to classify an input data into one of multiple different classifications. Such classifications can include a first class indicating that a responsive message indicates that an initial message likely includes offensive content or a second class indicating that a responsive message indicates that an initial message likely does not include offensive content. In some implementations, the machine learning model 134 can include one or more neural networks.

The machine learning model 134 can be trained using a training data item data set of labeled training data items. In some implementations, for example, each training data item can be an example of a responsive message that is labeled as (i) indicative of an initial message including hurtful content or (ii) not indicating of an initial message including hurtful content. If the training representation of the responsive message is not yet converted into a feature or numerical representation of the responsive message, the training representation of the responsive message can be converted into a feature or numerical representation of the responsive message prior to inputting the training representation of the responsive message into the machine learning model 134.

Features of such training responsive messages that are to be numerically represented during feature extraction can include the responsive message's textual content, images, gifs, videos, use of emojis/symbols/slang to convey intent of meaning or sentiment, reputation score of the user that submitted the responsive message, use of all capital letters that used to show emotion or anger, use of alternating capital or lower case letters to convey intent of meaning or sentiment (e.g., to show sarcasm), any subset thereof, any combination thereof, or other similar features.

For example, training data items can be designed such that "That's awful" is labeled as indicative of an initial message that includes offensive content whereas "That's awful j/k" or "That's awful ;)" may be labeled as indicative of an initial message that does not include offensive content. The difference in such examples is that the j/k (or just kidding) or ;) (or winking eye) indicate that the drafter of the responsive message was not being serious with the content of the responsive message and perhaps submitted the responsive comment in jest, sarcasm, or both. This is merely one example of features of a responsive message that can provide an indication as to the meaning of an initial message. However, there is no requirement that training data items or actual responsive messages received in real time and processed through a trained machine learning model are required to have such features. Instead, training data items used to train the machine learning model can include any combination of features including one or more of textual content, images, gifs, videos, use of emojis/symbols/slang to convey intent of meaning or sentiment, reputation score of the user that submitted the responsive message, use of all capital letters that used to show emotion or anger, use of alternating capital or lower case letters to convey intent ore meaning (e.g., to show sarcasm), any subset thereof, any combination thereof, or other similar features. Then, a human user can review the particular training data item and label the training data item as (i) indicative of an initial message including hurtful content or (ii) not indicating of an initial message including hurtful content. Alternatively, in some implementations, a training responsive data item can be generated by a simulator and simulator can assign a label indicating whether the training responsive message is (i) indicative of an initial message including hurtful content or (ii) not indicating of an initial message including hurtful content.

Once the set of training data items comprising a set of labeled training responsive messages is acquired, the machine learning model 134 can be trained, prior to execution of the example of FIG. 1, to predict a likelihood that an initial message provided by a first user device includes offensive content based on processing of responsive message content from a different user device provided in response to the initial message. This training is achieved by obtaining a labeled training responsive message, providing the training responsive message through the machine learning model 134, processing the training responsive message through the machine learning model 134 to generate output data, comparing the output data generated by the machine learning model 134 to the label for the training responsive message processed through the machine learning model 134, and adjusting one or more parameters of the machine learning model 134 based on the differences between the output generated by the machine learning model 134 based on the machine learning mode's processing of the training responsive message and the label for the training responsive message processed by the machine learning model 134. The training process can continue to iteratively process training responsive messages through the machine learning model 134 in this manner until the differences between output data generated by the machine learning model 134 for processed training responsive messages and the label for such training responsive messages falls within a predetermined difference threshold. Once the output data generated by the machine learning model 134 based on the machine learning model 134 processing a training responsive message begins to satisfy a predetermined difference threshold, then the machine learning model 134 can be considered to be trained.

The output engine 135 can obtain the output data 134a generated by the machine learning model 134 based on the machine learning model processing the first responsive message "So mean" 156a. The output data 134a can include, for example, a numerical value that provides an indication as to the likelihood that the responsive message "So mean" 156a indicates that the post 150 content 152 includes offensive content. This numerical value can include, for example, a probability value. The output engine 135 can store the output data 134a in the output data cache 136a for subsequent consideration by the evaluation engine 138.

The output data cache 136a is a database, memory, or cache that stores instances of output data 134c generated by the machine learning model for different responsive messages. In some implementations, for example, for certain messaging environments such as a social media network environment, an initial message such as post 150 having content 152 can garner multiple responsive messages (e.g., multiple comments). In such implementations, the system 100 typically has to process each of the multiple responsive messages through the machine learning model 134, thus generating multiple instances of output data 134a (i.e., one for each responsive message) that have to be evaluated to determine whether the post 150 content 152 includes offensive content. Thus, as the system 100 iterates through responsive messages, the output data 134a generated for one or more responsive messages processed through the machine learning model 134 can be cached in the output data cache 136a.

Continue with the example of FIG. 1, once the output engine 135 has cached the output data 134a generated by the machine learning model based on processing the first response message 156a, execution of the system 100 in the example of FIG. 1 can continue by using the decisioning engine 137 to determine whether there is another responsive message that is to be processed by the system 100. If the decisioning engine 137 determines that there is another responsive message to be processed by the system 100, execution of the system 100 can continue with the responsive message selection engine 132 obtained another responsive message. Alternatively, if the decisioning engine 137 determines that there is not another responsive message to be processed by the system 100, then the decision engine 137 can determine that execution of system 100 should continue to use of the evaluation engine 138 to analyze, or otherwise interpret, the one or more instances of output data 136a cached by the output engine 135 in the output data cache 136a.

In the example of FIG. 1, the decisioning engine can determine that there is another responsive message 156b which includes content "True!". In this example, the responsive message selection engine 132 can access the other responsive message 156 and provide the other responsive message 156b as input to the input engine 133. The system 100 can continue to process the other responsive message 156b through each subsequent stage of the system 100 as described above with respect to the responsive message 156a. The system 100 can continue to iteratively process each of the responsive messages 156c, 156d, 156e, 156f through the system 100 until the system stores output data 134c generated for each respective responsive message provided responsive to the post 150 content 152. Once the decisioning engine determines that there are no additional responsive messages 156 for processing, the decisioning engine 137 can determine that execution of the system 100 is to continue by using the evaluation engine 138 to analyze, or otherwise interpret, the output data 134c stored in the output data case 136a.

In the example of FIG. 1, the system 100 can perform the aforementioned processing on each of responsive messages "So mean" 156a, "True!" 156b, "Oh no he didn't!" 156c, "That's awful" 156d, "OMG" 156e, and "hilarious" 156f. In this example, the system 100 would generate six instances of output data 134a generated by processing data corresponding to each of the responsive messages through the trained machine learning model 134, with each instance of output data 134a indicating a likelihood that one of the six responsive messages indicates that the post 150 content 152 includes offensive content. In this example, the output data 134a may indicate that responsive messages 156a, 156c, 156d, and 156e indicate that the post 150 content 152 likely includes offensive content. In contrast, the output data 146, prior to any adjustment, may indicate that responsive messages 156b and 156f do not indicate that that the post 150 content 152 likely includes offensive content. The output data 136a for each of the six messages is stored in the output data cache 136a.

The evaluation engine 138 is configured to determine, based on an evaluation of the output data 134a generated for one or more responsive messages, whether the post 150 content 152 includes offensive content. First, the evaluation engine 138 can obtain the output data 134a stored in the output data cache 136a and, for each instance of output data 134a corresponding to a particular responsive message (e.g., "So mean" 156a) of an initial message (e.g., "Sally is sus" 152), compare the output data 134 to a predetermined threshold. If the output data 134a satisfies the predetermined threshold, then the evaluation engine 138 can determine that the output data 134a generated by the machine learning model 134 based on the machine learning model's 134 processing of the particular responsive message indicates that the initial message (e.g., "Sally is sus" 152 likely include offensive content. Alternatively, if the output data 134a does not satisfy the predetermined threshold, then the evaluation engine 138 can determine that the output data 134a generated by the machine learning model 134 based on the machine learning model's 134 processing of the particular responsive message likely does not indicate that the initial message (e.g., "Sally is sus" 152) includes offensive content.

For purposes of the disclosure, output data 134a may satisfy a threshold by being less than the threshold or greater than the threshold and can be based on the design of the threshold in practice. For example, assume a threshold with a magnitude of 0.5 and the output data generated by a machine learning model has a magnitude of 0.6, which for purposes of this example corresponds to a message that indicates that an initial message includes offensive content. A system can be designed that determines whether the output data 0.6 is greater than a predetermined threshold 0.5, and if so, determining that the output data corresponds to a responsive message that indicates that an initial message likely includes offensive content. In the alternative, a system of the same general function can be implemented by negating both the threshold and the output data and determining whether the output data is less than the predetermined threshold. For purposes of this disclosure, both of the aforementioned implementations, regardless of whether the test is "greater than" or "less than," have output data that satisfies the predetermined threshold.

If there is only one responsive message, which may be the case in certain instances, then the evaluation engine 138 can determine, based on a single comparison of the output data 134a to a single threshold, whether the initial message includes offensive content. For example, assume, for the sake of example, that the only responsive message in the example of FIG. 1 was "So mean" 156a. In such implementations, the responsive message "So mean" 156a is processed through the system 100 to generate a single instance of output data 134a. The evaluation engine 138 would compare the single instance of output data 134a to a threshold, determine that the output data 134a satisfies the threshold, and then generate output data 138a indicating, to the mitigation engine, that the post 150 content 152 likely includes offensive content. However, the present disclosure is not so limited.

For example, in some implementations, there may be multiple responsive messages to an initial message, and in such circumstances, the system 100 will generate multiple instances of output data 134a—i.e., one instance of output data 134a for each responsive message 156a-e. In such implementations, the evaluation engine 138 can use one or more responsive message specific counters that are incremented based on comparison of each output data 134a instance to a predetermined threshold. For example, in some implementations, the evaluation engine 138 can use a first counter such as, e.g., a likely offensive content counter, a second counter such as, e.g., a likely not offensive content counter, or a combination of both, to track a number of occurrences of output data 134a indicating that a corresponding responsive message indicates that the post 150 content 152 likely includes offensive content, likely does not include offensive content, or both. In such implementations, the first counter, the second counter, or both can be initialized to zero. Then, the first counter can be incremented each time output data 134*a* corresponding to a particular responsive message satisfies a predetermined threshold, the second counter can be incremented each time output data 134*a* corresponding to a particular responsive message does not satisfy the predetermined threshold, or both.

In some implementations, the evaluation engine 138 can then evaluate the first counter (e.g., a likely offensive counter), the second counter (e.g., a likely not offensive counter), or both, to determine whether or not the post 150 content 152 likely includes offensive content. In some implementations, the evaluation engine 138 may make such determinations based on a current count of the first counter (e.g., a likely offensive counter) alone. For example, in such implementations, if the first counter (e.g., a likely offensive counter) satisfies a predetermined threshold number of occurrences, then the evaluation engine 138 can generate output data 138*a* indicating that the post 150 content 152 likely includes offensive content. By of example, assume the predetermined threshold is twenty-five. In such an implementation, once the first counter has been incremented to twenty-six indicating that twenty-six instances of output data 134 corresponding to a responsive message have been generated by the machine learning model that satisfy a threshold level of probability, then the evaluation engine 138 can determine that the post 150 content 152 likely includes offensive content.

In some implementations, the evaluation engine 138 can evaluate the first counter and the second counter to determine whether the post 150 content 152 likely includes offensive content. In such implementations, the evaluation engine 138 can monitor a current count of both the first counter (e.g., likely offensive counter) and the second counter (e.g., likely not offensive counter), and evaluate the gap in the count tabulated by each of the counters. In such implementations, the evaluation engine 138 can detect when a first counter (e.g., likely offensive counter) exceeds the second counter (e.g., likely not offensive counter) by a threshold number of number of responsive messages having output data 134*a* that satisfy a predetermined threshold level of probability. In such implementations, upon detecting that the first counter (e.g., likely offensive counter) exceeds the second counter (e.g., likely not offensive counter) by a predetermined threshold, then the evaluation engine 138 can determine that the post 150 content 152 likely includes offensive content.

In other implementations using the first counter (e.g., likely offensive counter) and the second counter (e.g., likely not offensive counter), the evaluation engine 138 can detect, at any particular point in time, whether the first counter (e.g., likely offensive counter) is greater than the second counter (e.g., likely not offensive counter). Upon detecting that the first counter (e.g., likely offensive counter) is greater than the second counter (e.g., likely not offensive counter), the evaluation engine 138 can determine that the post 150 content 152 likely includes offensive content. In some implementations, the evaluation engine 138 can be configured to make an offensive content determination based on the first counter (e.g., likely offensive counter) being greater than the second counter (e.g., likely not offensive counter) after a threshold number of responsive messages have been submitted for an initial message.

The evaluation engine 138 can also analyze the output data 134*a* to determine whether the post 150 content 152 does not include offensive content use the first counter (e.g., a likely offensive counter), the second counter (e.g., a likely not offensive counter), or both. In some implementations, the evaluation engine 138 may make such determinations based on a current count of the second counter (e.g., a likely not offensive counter) alone. For example, in such implementations, if the second counter (e.g., a likely not offensive counter) satisfies a predetermined threshold number of occurrences, then the evaluation engine 138 can generate output data 138*a* indicating that the post 150 content 152 likely does not include offensive content. By way of example, assume the predetermined threshold is fifty. In such an implementation, once the second counter has been incremented to fifty-one indicating that fifty-one instances of output data 134*a* corresponding to a responsive message have been generated by the machine learning model that do not satisfy a threshold level of probability, then the evaluation engine 138 can determine that the post 150 content 152 likely does not include offensive content.

In some implementations, the evaluation engine 138 can evaluate the first counter and the second counter to determine whether the post 150 content 152 likely does not include offensive content. In such implementations, the evaluation engine 138 can monitor a current count of both the first counter (e.g., likely offensive counter) and the second counter (e.g., likely not offensive counter), and evaluate the gap in the count tabulated by each of the counters. In such implementations, the evaluation engine 138 can detect when a second counter (e.g., likely not offensive counter) exceeds the first counter (e.g., likely offensive counter) by a threshold number of number of responsive messages having output data 134*a* that does not satisfy a predetermined threshold level of probability. In such implementations, upon detecting that the second counter (e.g., likely not offensive counter) exceeds the first counter (e.g., likely offensive counter) by a predetermined threshold, then the evaluation engine 138 can determine that the post 150 content 152 likely does not include offensive content.

In other implementations using the first counter (e.g., likely offensive counter) and the second counter (e.g., likely not offensive counter), the evaluation engine 138 can detect, at any particular point in time, whether the second counter (e.g., likely not offensive counter) is greater than the first counter (e.g., likely offensive counter). Upon detecting that the second counter (e.g., likely not offensive counter) is greater than the first counter (e.g., likely offensive counter), evaluation engine 138 can determine that the post 150 content 152 likely does not include offensive content. In some implementations, the evaluation engine 138 can be configured to make an offensive content determination based on the second counter (e.g., likely not offensive counter) being greater than the first counter (e.g., likely offensive counter) after a threshold number of responsive messages have been submitted for an initial message.

In some implementations, the first counter (e.g., likely offensive counter) and the second counter (e.g., likely not offensive counter) may be equal. In such implementations, the evaluation engine 138 can access the message metadata database 136*b* in order to access message metadata that may be used to determine whether the post 150 content 152 includes offensive content. In such implementations, for example, the based on a determination, the evaluation engine 138 can access message metadata such as, for example, data indicating a number of likes associated with the initial message, data indicating a number of different types of emojis associated with the initial message, data indicating a number of comments associated with the initial message, or any combination thereof. In such implementations, the evaluation engine 138 can determine whether the message metadata, which itself is submitted in response to the initial message (e.g., post content 152), indicates that the post 150 content 152 likely includes offensive content.

The evaluation engine 138 can determine that the message metadata indicates that the post 150 content 152 likely includes offensive content in a number of different ways. For example, if the number of comments (e.g., responsive messages 156) on a post 150 content 152 exceeds the number of likes of the post 150 content 152, then the evaluation engine 138 can determine that the message metadata indicates that the post 150 content 152 likely includes offensive content. This is because, for example, users had to voice their disapproval through comments instead of signaling their approval or agreement via likes. By way of another example, if post 150 enables emojis to be selected to indicate user's emotion towards content 152, then the evaluation engine 138 can determine that the post 150 content 152 likely includes offensive content if the number of angry emojis exceeds a number of happy emojis, loving emojis, or any combination thereof, by a threshold amount.

While examples of number of comments exceeding a number of likes by a threshold amount and a number of angry emojis exceeding happy emojis (and/or emojis of other emotions) by a threshold amount are provided, the present disclosure is not so limited. Instead, similar use of thresholds that were used for the first counter and the second counter can also be used for likes vs. comments and angry emojis vs. happy emojis (or other emojis). For example, in some implementations, if a threshold number of angry emojis are detected, the evaluation engine 138 can determine that the post 150 content 152 likely includes offensive content.

The examples of the evaluation engine's 138 use message metadata above are based on use of the message metadata to aid in a determination as to whether a post 150 content 152 likely includes offensive content. However, the present disclosure is not so limited. Instead, in some implementations, the evaluation engine 138 can use the message metadata stored in the message metadata database 136b to determine, independently of the first counter and the second counter, whether the post 150 content 152 likely includes offensive content. In such implementations, the ratio of likes to comments, angry emojis to other emojis, number of shares, likes to comments on shares of the post 150 content 152, angry emojis to other emojis on shares of the post 150 content 152, the like, or any combination thereof may be used to indicate whether or not the post 150 content 152 likely includes offensive content.

Other information stored in the message metadata database 136b can also be used by the evaluation engine 138 in determining whether output data 134a indicates that a particular responsive message (e.g., "So Mean" 156a) indicates that an initial message (e.g., post 150 content 152 "Sally is Sus") includes offensive content. In some implementations, for example, the message metadata database 136b can store a reputation score associated with a user that posts one or more responsive message 156a-e. In such implementations, the evaluation engine 138 can access the reputational score of a user that posted a responsive message and adjust the output data 134a generated by the machine learning model 134 after processing the responsive message based on the reputation score of the user. For example, such optional reputation scores 170 of each user that posted a responsive message to the initial post 150 content 152 is shown in FIG. 1 in the dashed box next to the exemplary post 150. In this example, the user that submitted responsive message "True!" 156b has a reputation score of 0.1 whereas the user that submitted responsive post "That's awful" 156d has a reputation score of 0.9. These respective reputational scores can be used by the evaluation engine 138 when evaluating output data 134a for a responsive message against a probability threshold. In particular, the reputational scores can be used to emphasis output data 134a from users with a high reputational score and diminish output data 134a from users with a low reputational scores. Though exemplary reputational scores are shown in FIG. 1 for ease of understanding, such scores may or may not be displayed in an actual implementation and may be, for example, merely a score for a user tracked by the messaging system 131.

While the aforementioned example provides an example of the reputation score in post processing—i.e., adjusting output data generated by the machine learning model 134. The present disclosure is not so limited. Instead, in some implementations, the reputation score associated with a responsive message (e.g., 156a) as a signal to the machine learning model to process to generate output data 134a. In such implementations, the machine learning model can be trained to predict whether an initial message likely includes offensive content based on process of a response message and a reputation score for the responsive message.

If the evaluation engine 138 determines that responsive message(s) 156 indicate that the post 150 content 152 likely includes offensive content, the evaluation engine can generate output data 138a indicating that the post 150 content 152 likely includes offensive content. The evaluation engine 138 can provide the output data 138a to the mitigation engine 139. Alternatively, if the evaluation engine 138 determines that the responsive message(s) 156 indicate that the post 150 content 152 likely does not include offensive content, then the evaluation engine 138 can terminate execution of a process by the system 100 for determining whether the post 105 content 152 includes offensive content.

The mitigation engine 139 can receive output data 138a from the evaluation engine 138 and, based on a determination by the mitigation engine 138 that the output data 138a indicates that the content 152 likely includes offensive content, the mitigation engine 139 can perform one or more remedial operations to mitigate exposure to the offensive content. Such remedial operations can include, for example, generating output data 139a that instructs the messaging system 131 to delete the post 150 content 152. In such implementations, deletion of the post 150 content 152 prohibits any other user from viewing the initial message content after its deletion. In some implementations, performance of a remedial action by the mitigation engine 139 can include instructing the messaging system 131 to flag the post 150 content 152 for deletion, without actually deleting the post 150 content 152. In some implementations, performance of a remedial action may include, for example, instructing the message system to flag the post 150 content 152 for human review. In some implementations, performance of a remedial action by the mitigation engine 139 can include instructing the messaging engine 131 to obfuscate all, or a portion of, the content 152 in order to prohibit users of the messaging system 131 from viewing the likely offensive content. In some implementations, the likely offensive content may be obfuscated for each user or user device 120-a to 120-N except the user or user device 110 that posted the likely offensive content. In such implementations, other user would not be able to view the likely offensive content, but the user that posted the likely offensive content could still view the likely offensive content.

In some implementations, performing a remedial operation by the mitigation engine 139 can include instructing the messaging system 131 to adjust a content score that is associated with the post 150 content 152 and is used to control, at least in part, the post 150 content 152 ranking in a list of posts or messages. For example, in some implementations, the content score can be used to determine whether the post 150 content 152 appears in a user's social media news feed, the locations where the adjusted content scores appear in the news feed relative to other posts or links, the like, or a combination of both. Accordingly, in such implementations, performance of a remedial operation by the mitigation engine can include instructing the messaging system 131 to adjust the content score associated with the post 150 content 152 in a manner that causes the post 150 content 152 to be in list of content items (e.g., other posts, other links, or the like) so that visibility of the post 150 content 152 is reduced.

In some implementations, performance of a remedial operation by the mitigation engine 139 can include notifying a user of the user device 110 that posted the post 150 content 152 that was determined to likely include offensive content based on one or more responsive messages and prompt the user of the user device to rethink whether the user wants to leave the post 150 content 152 posted, or otherwise publicly available. In such implementations, a notification can be generated and then transmitted to the user device 110 using the network 115. In some implementations, the notification, when processed by the user device 110, can prompt a user of the first user device to indicate whether the user wants to delete the post 150 content 152 or not delete the post 150 content 152. In some implementations, deletion of the post 150 content 152 can include deletion of the entire post 150, including all comments and message metadata. In other implementations, the notification may additionally, or alternatively, include an option for the user of the user device 110 to edit the post 150 content 152.

In some implementations, performance of a remedial operation by the mitigation engine 139 can include the mitigation engine storing all, or a portion, of the content 152 in an offensive content database 140. In some implementations, the entire content 152 is stored in the offensive content database 140. In some implementations, the mitigation engine 139 can perform, for example, natural language processing on the content 152 to identify and extract the likely offensive content. For example, in some implementations, the mitigation engine 139 can process the content 152 and remove all non-adjective words include, for example, entity names, location names, articles, and the like. Then, the remaining term(s), which are likely to correspond to the offensive content, can be stored in the offensive content database 140. In other implementations, a human user can review the flagged content 152 and determine which part of the content is likely offensive. Then, the portion of the content 152 that is likely offensive may be stored in the offensive content database 140. Use either of these processes, the mitigation engine 140 or human user reviewing the flagged content 152 can determine that the term "sus" is to be added 139*b* to the offensive content database as likely being offensive content.

In some implementations, the performance of a remedial operation by the mitigation engine 139 can include the mitigation engine using the content 152 of the post 150 to train or retrain a machine learning model to detect offensive content. In some implementations, training or retraining such a machine learning model can include actually causing the content 152 to be labeled as offensive content and then be processed through the machine learning model, comparing the label of the content 152 to the output generated by the machine learning model, and then adjusting parameters of the machine learning model based on the differences between output generated by the machine learning model and the label of the content 152. In other implementations, performance of the remedial operation may merely include labeling the content 152 as offensive content and storing the labeled content 152 as a training data item in a training data item database that is to be used, at a later date, to train a machine learning model to detect offensive content. While the content 152 can be used as a new training data item to train a machine learning model to detect offensive content, such a model would be different than the model 134, as the model 134 is trained to determine whether a responsive message (e.g., a comment 156*a*) indicates that an initial message (e.g., a post 150 content 152). In this example of a remedial operation, however, the different machine learning model would be trained on the actual content 152 to detect actual content that is likely offensive.

FIG. 2 is a flowchart of an example of a process 200 for mitigating spread of offensive content via a communication system based on a responsive message. For convenience, the process 200 will be described as being performed by a system such as system 100.

A system can begin execution of the process 200 by using one or more computers to obtain, after receipt of first data corresponding to message content of a first message that was transmitted by a first user device, second data corresponding to another message that was transmitted after the first message by a second user device (210). In some implementations, the first message content is content an initial social media post and the second message content is content of a comment on the initial social media post. In other implementations, the first message content is content of a message received from a messaging application of the first user device and the other message content is content of a message from a messaging application of the second user device in response to the first message content.

The system can continue execution of the process 200 by using one or more computers to determine, based on the second data, whether the first data corresponds to content that is likely offensive (220). The determination at stage 220 can further include the system using one or more computers to provide at least the second data as an input to a machine learning model that has been trained to detect a likelihood that a first message content includes offensive content based message contents of a second message submitted after the first message (222). The determination at stage 220 can further include the system using one or more computers to obtain output data generated by the machine learning model based on the machine learning model processing the second data (224). The determination at stage 220 can further include the system using one or more computers to determine whether the obtained output data satisfies a predetermined threshold (226).

In response to a determination, by the system, at stage 220, that the first message transmitted by the first user device likely includes offensive content, the system can continue execution of the process 200 by using one or more computers to performing a remedial operation to mitigate exposure of other users to the offensive content (230).

In some implementations, the system can continue execution of the process 200 by using one or more computers to adjust the obtained output data of stage 224 based on a reputation score associated with a user of the second user device that submitted the other message. In such implementations, the reputation score can indicate an extent that the other message submitted by the user of the second user device can be trusted to indicate that the first message content is likely offensive.

In some implementations, performance of a remedial operation to mitigate exposure of other users to the offensive content by the system at stage 230 can include the system using one or more computers to generate notification data that, when processed by the first user device, causes the first user device to prompt a user of the first user device to indicate whether the user wants to delete the first message content or not delete the first message content. In some implementations, the system can continue execution of the process 200 by using one or more computers to receive data corresponding to an indication that the user of the first user device wants to delete the first message content. In such implementations, in response to receiving data corresponding to an indication that the user of the first user device wants to delete the first message content, the system can continue execution of the process 200 by using one or more computers to delete the first message. In such implementations, deletion of the first message content can prohibit any other user from viewing the first message content after its deletion.

In some implementations, performance of a remedial operation to mitigate exposure of other users to the offensive content by the system at stage 230 can include the system using one or more computers to delete the first message without user interaction or prompt. In this context, deletion of the first message content similarly prohibits any other user from viewing the first message content after its deletion.

In some implementations, performance of a remedial operation to mitigate exposure of other users to the offensive content by the system at stage 230 can include the system using one or more computers to flag the first message for deletion. Additionally, or alternatively, performance of a remedial operation to mitigate exposure of other users to the offensive content by the system at stage 230 can include the system using one or more computers to flag the first message for human review.

In some implementations, performance of a remedial operation to mitigate exposure of other users to the offensive content by the system at stage 230 can include the system using one or more computers to adjust a content score associated with the first message content. In such implementations, the adjusted content score can be used to cause the first message content to be demoted in list of content items such as a social media news feed.

In some implementations, performance of a remedial operation to mitigate exposure of other users to the offensive content by the system at stage 230 can include the system using one or more computers to store the content of the first message in a database of offensive content used to screen messages or other content for offensive content.

In some implementations, performance of a remedial operation to mitigate exposure of other users to the offensive content by the system at stage 230 can include the system using one or more computers to train a machine learning model to detect subsequent messages that include the first message content as offensive content.

In some implementations, performance of a remedial operation to mitigate exposure of other users to the offensive content by the system at stage 230 can include the system using one or more computers to cause a warning message to be displayed in proximity to the first message content within a messaging application.

In some implementations, the machine learning model includes one or more neural networks.

Figure 2A:
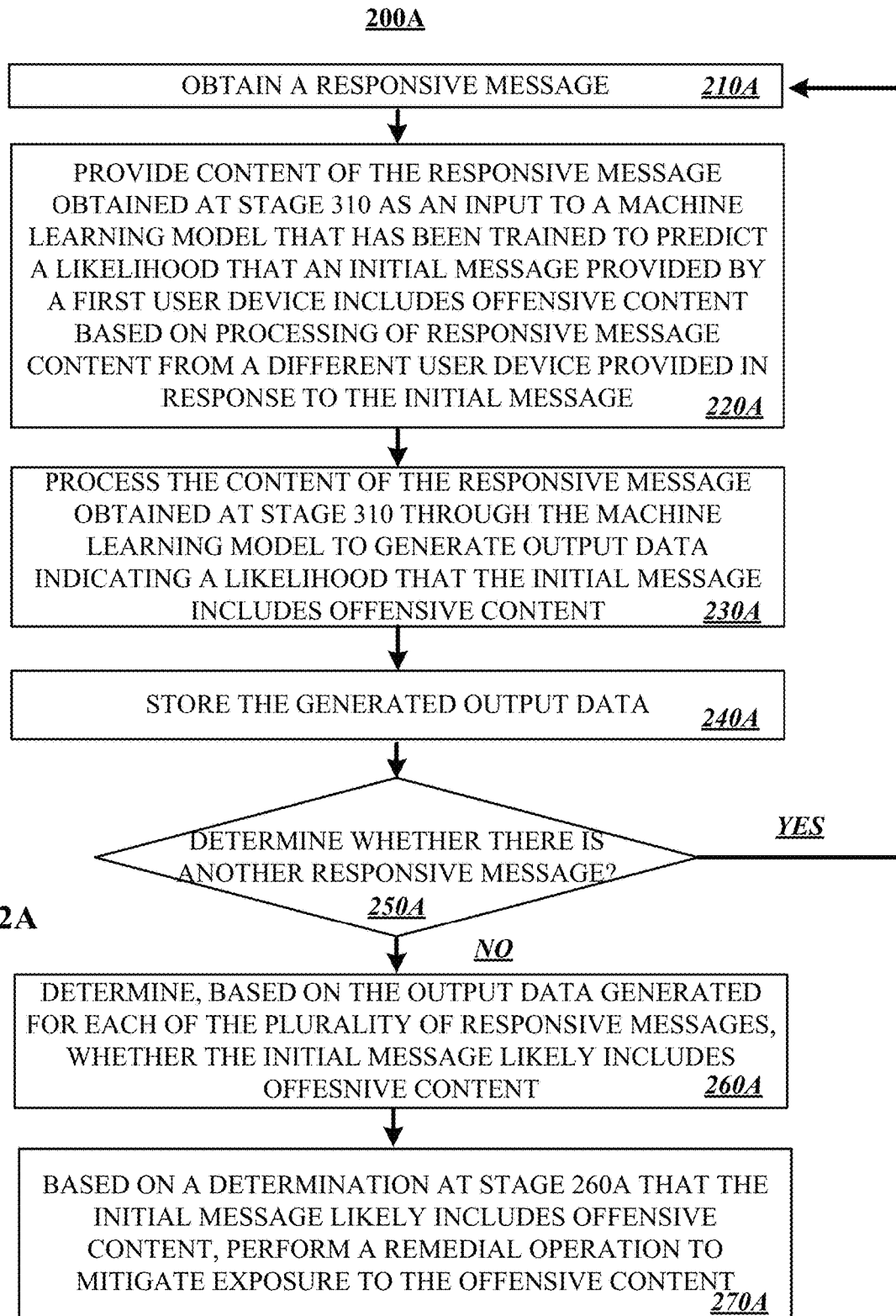
FIG. 2A is a flowchart of an example of another process for mitigating spread of offensive content via a communication system based on a plurality of responsive messages.

FIG. 2A is a flowchart of an example of another process 200A for mitigating spread of offensive content via a communication system based on a plurality of responsive messages. For convenience, the process 200 will be described as being performed by a system such as system 100.

The system can begin execution of the process 200A by using one or more computers to obtain a particular responsive message (210A).

The system can continue execution of the process 200A by using one or more computers to provide content of the particular responsive message as an input to a machine learning model that has been trained to predict a likelihood that an initial message provided by a first user device includes offensive content based on processing of responsive message content from a different user device provided in response to the initial message (220A).

The system can continue execution of the process 200A by processing the content of the particular responsive message through the machine learning model to generate output data indicating a likelihood that the initial message includes offensive content (230A).

The system can continue execution of the process 200A by storing the generated output data (240A).

The system can continue execution of the process 200A by determining whether there is another responsive message for processing (250A). If the system determines that there is another responsive message for processing at stage 250A, then the system can continue execution of the process 200A at stage 210A. Alternatively, if the system determines at stage 240A that there is not another responsive message, the system can determine to continue execution of the process 200A at stage 260A.

At stage 260A, the system can continue execution of the process 200A by using one or more computers to determine, based on the output data generated for each of the plurality of responsive messages, whether the initial message likely includes offensive content (260A).

Then, based on a determination by the system at stage 260A that the initial message likely includes offensive content, the system can continue execution of the process 200A by using one or more computers to perform a remedial operation to mitigate exposure to the offensive content (270A).

In some implementations, the initial message is content of a social media post and the responsive message is content of a comment on the social media post. In other implementations, the initial message is content of a message received from a messaging application of the first user device and the responsive message is content of a message input received from a messaging application of the second user device in response to the initial message.

In some implementations, the determination at stage 260A can include the system using one or more computers to perform an analysis of each particular instance of output data generated for each responsive message. In some implementations, performing such an analysis can include the system using one or more computers to determine whether the particular instance of output data satisfies a predetermined threshold. The system can use one or more computers to increment one of a plurality of counters based on the determination as to whether the particular instance of output data satisfies a predetermined threshold. In some implementations, incrementing one of the plurality of counters can include the system using one or more computers to increment a first counter corresponding to a first determination that the particular responsive message indicates that the initial message is likely offensive, or the system using one or more computers to increment a second counter corresponding to a second determination that the particular responsive message indicates that the initial message is not likely offensive.

In some implementations, the determination at stage 260A can include the system using one or more computers to determine that the initial message likely includes offensive content if the first counter is greater than the second counter.

In some implementations, the determination at stage 260A can include the system using one or more computers to determine that the initial message likely includes offensive content if the first counter is greater than the second counter after evaluation of a threshold number of responsive messages.

In some implementations, the determination at stage 260A can include the system using one or more computers to determine that the initial message likely includes offensive content if the first counter satisfies a predetermined threshold number of occurrences.

In some implementations, the determination at stage 260A can include the system using one or more computers to determine that the initial message likely does not include offensive content if the second counter is greater than the first counter.

In some implementations, the determination at stage 260A can include the system using one or more computers to determine that the initial message likely does not include offensive content if the second counter is greater than the first counter after evaluation of a threshold number of responsive messages.

In some implementations, the determination at stage 260A can include the system using one or more computers to determine that the initial message likely does not include offensive content if the second counter satisfies a predetermined threshold number of occurrences.

In some implementations, the determination at stage 260A can include the system using one or more computers to determine that the first counter and the second counter are equal. In such implementations, the system can continue execution of the process 200 by using one or more computers to determine whether the initial message likely includes offensive content based on one or more of a number of likes associated with the initial message, a number of different types of emojis associated with the initial message, or a number of comments associated with the initial message.

In some implementations, the performance of a remedial operation at stage 270A can include the system using one or more computers to generate notification data that, when processed by the first user device, causes the first user device to prompt a user of the first user device to indicate whether the user wants to delete the initial message content or not delete the initial message content. In such implementations, the system can continue execution of the process 200A by using one or more computers to receive data corresponding to an indication that the user of the first user device wants to delete the initial message content. In response to receipt of data corresponding to an indication that the user of the first user device wants to delete the initial message content by the system, the system can continue execution of the process 200A by using one or more computers to delete the initial message. In such instances, deletion of the initial message content can prohibit any other user from viewing the first message content after its deletion.

In some implementations, the performance of a remedial operation at stage 270A can include the system using one or more computers to delete the initial message. In such instances, deletion of the initial message content can prohibit any other user from viewing the initial message content after its deletion.

In some implementations, the performance of a remedial operation at stage 270A can include the system using one or more computers to flag the initial message for deletion.

In some implementations, the performance of a remedial operation at stage 270A can include the system using one or more computers to adjust a content score associated with the initial message content. In some implementations, the adjusted content scores can cause the initial message content to be demoted in list of content items.

In some implementations, the performance of a remedial operation at stage 270A can include the system using one or more computers to store the content of the initial message in a database of offensive content used to screen messages or other content for offensive content.

In some implementations, the performance of a remedial operation at stage 270A can include the system using one or more computers to train (or retrain) a machine learning model to detect subsequent messages that have the initial message content as offensive content.

In some implementations, the performance of a remedial operation at stage 270A can include the system using one or more computers to cause a warning message to be displayed in proximity to the initial message content within a messaging application.

Figure 3:
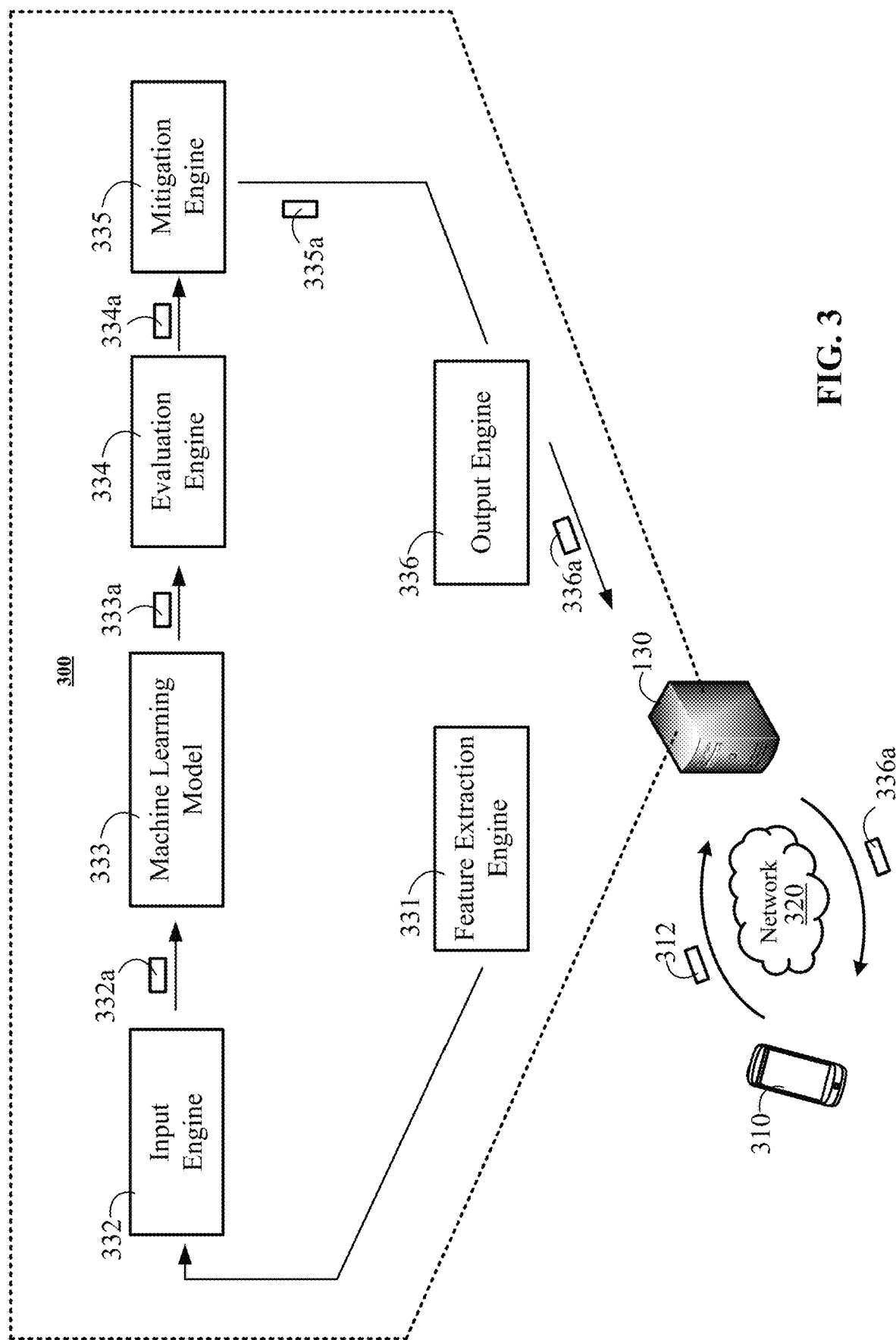
FIG. 3 is a diagram of an example of a system for detecting that a user is exhibiting symptoms of mental instability and performing one or more mitigating operations.

FIG. 3 is a diagram of an example of a system 300 for mitigating distribution of offensive content by a user device based on a determination that a user of the user device is exhibiting one or more forms of mental instability. The system can include a user device 310, a network 320, and an application server 330. The user device 310 is generally the same type of user device as user device 110 of FIG. 1, the network 320 can generally be the same type of network as the network 115, and the application server 330 can generally be the same type of application server as application server 130. However, in the example of FIG. 3, the user device 310 and the application server 330 are configured with different processing engines, models, and/or capabilities. Such engines, models, and/or capabilities may be alternative engines, models, and/or capabilities than those described with respect to FIG. 1 or additional engines, models, and/or capabilities to those described with respect to FIG. 1.

In the example of FIG. 3, the application server 330 can be configured to include a feature extraction engine 331, an input engine 332, a machine learning model 333, an evaluation engine 334, a mitigation engine 335, and an output engine 336. The functionality of each of engines and the model is described in more detail below.

In the example of FIG. 3, a user of the user device 310 can enter input 312 into the user device 310. Input can be entered in a variety of different ways and for a variety of different purposes. In some implementations, for example, input 312 can be entered by typing text using a physical or virtual keyboard of the user device 310, speaking words detected via a microphone of the user device 310, via tapping/gestures/drawings on a touchscreen display of the user device 310, images or video captured via a camera of the user device, interacting with the user device in any way (e.g., consuming music, reading an e-book, browsing a website, watching a video, or the like), or any combination thereof. The present system 300 is configured to monitor inputs 312 by the user of user device 310 and determines based on the monitored inputs whether the user of user device is exhibiting one or more forms of mental instability. For purposes of this disclosure, mental instability can include, for example, any form of mental illness, depression, thoughts of self-harm or suicide, thoughts of harm to others or animals, or a combination thereof.

As a user starts to exhibit one or more forms of mental instability, there is a risk that the user can become offensive and/or harmful to himself/herself, offensive and/or harmful to others, or both. Accordingly, upon the detection of the presence of one or more forms of mental instability, the system 300 can perform one or more remedial operations to limit the reach of the user's potentially offensive and/or harmful impact on others while also providing resources to a user that may be aid helping the user.

In the example of FIG. 3, input 312 can be provided to the application server 330 using the network 320. In some implementations, the input 312 can be provided as the input can be aperiodically provided to the application server 330. For example, in some implementations, the input 312 can be provided to the application server as it is created, entered, or transmitted. For example, as a user of user device 310 sends input content 312 such as a text message, picture message, audio message, video message, or combination thereof, to another user or as the user device 310 posts content (e.g., text, image, video, audio, or a combination there) to a social media page, the input content 312 or copy thereof can also be routed to the application server 330 using the network 320. The application server 330 can receive the input content 312 and provide the received input content 312 into the feature extraction engine 331.

Another example of aperiodic providing of input 312 can include capturing usage data as a user using an application and then providing the captured user data 312 to the application server 330 via the network 320. In this example, input 312 can include, for example, information describing a website the user is viewing, information describing media content the user is consuming, information describing the orientation of the device (e.g., using sensor data such as accelerometers, gyroscopes, or the like), selfie images of the user while using the device, or the like, can be captured during use and sent as input 312.

In other implementations, however, the input 312 can be provided periodically. In some implementations, periodic batches input content 312 can be provided to the application server 330 in defined intervals such as, for example, every 30 minutes, every 60 minutes, once per day, once per week or the like. While periodic transmissions may be configured in a manner that conserves network resources such as, for example, periodic transmissions during off peak hours, such periodic transmission may be less effective at identifying the onset of mental instability and/or reduce the impact of offensive or harmful behavior of the user towards himself/herself or others—as the detection of mental instability would be delayed by length of the defined period or interval.

Regardless of the input content transmission type, the application server 330 can receive the input content 312 and provide input content 312 as an input to the feature extraction engine 331.

The feature extraction engine 331 is configured to extract features from the input content 312 that may be indicative of mental instability. In particular, the feature extraction engine 331 is configured to process received input content into numerical features for processing by the input engine 332, machine learning model 333, or both. In some implementations, examples of input content 312 that can be provided as an input to the feature extraction engine 331 can include, for example, message content (e.g., text, image, audio, video, or a combination), social media post content (e.g., text, image, audio video, or a combination), content referenced by a URL shared by the user via a message application or social media post, content a user is or has read on the user device 310, content a user is or has watched on the user device 310, an amount of time the user has stared at a computer screen of the user device 310 without moving the user device 310, features of a selfie image of the user of user device captured by the user device 310 while the user using a messaging application to transmit one or more message, features of a selfie image of the user of user device 310 captured by the user device 310 while the user uses a social media application to post content or interact with content, an amount of pressure applied by a user when tapping on a device as detected by device sensors while using a messaging application or social media application, data indicating vocal outbursts exceeding a threshold decibel level while using an application (e.g., messaging application, social media application or site, gaming application, or the like), sensor data indicating that the user device 310 was recently thrown, or any combination thereof. While the aforementioned list of content from which features can be extracted is provided, the aforementioned list should not be viewed as limiting. Instead, features can be extracted from any data reported to the application server 331 that may be indicative of user instability. The extracted features 331a can be provided as an input to the input engine 332.

The input engine 332 is configured to receive the extracted features 331a and generate an input vector 332a for input to the machine learning model 333. Generation of the input vector 332a can include organizing the numerical feature values generated by the feature extraction engine 331 into fields of the input vector 332a. In some implementations, the input engine 332 can be configured to weight or rank features organized into the input vector 332a to emphasize or de-emphasize certain features. In some implementations, such emphasis, deemphasis, or both, of certain features can be adjusted in order to evaluate input content 312 for particular symptoms of mental instability. In some implementations, the adjustment can be a dynamic adjust determined, automatically, by the system 300. For example, in some implementations, the application server 330 may detect that the user of user device 310's behavior is (i) trending in a particular direction (e.g., trended of messages including content about suicide) or (ii) consuming content related to a particular topic (e.g., viewing content related to suicide, content related to how to commit suicide, content related to suicide's effect on family, movies where character committed suicide, or the like). In such implementations, the input engine 332 may also have access to a mapping, which maps a set of one or more symptoms to one or more features. Then, the input engine 332 adjust the weight or rank of features in the input feature vector 332a to emphasize or deemphasize the consideration of such features by the machine learning model 333 during the inferences stage based on the determined trend or topic, with the inference stage being the stage of execution of system 300 where the machine learning model 333 processes the input vector 332a to generation output data 333a.

By way of example, if the application server uses a content analysis engine (not shown in FIG. 3) to determine that the input content 312 indicates the user of user device 310 is texting about suicide, watching videos about suicide, or the like, such a determination can be communicated to the input engine 332 and the input engine can use weights to emphasize features associated with suicide in the input feature vector 332a. Alternatively, if the content analysis engine (not shown in FIG. 3) detects a sentiment in message content, content consumed by user, or a combination of both, indicating the user may be sad or depressed, the content analysis engine can communicate such detection of sentiment to the input engine 332 and the input engine can use weights to emphasize features associated with sadness or depression.

In other implementations, the adjustment can be responsive to a user command. For example, in some implementations, the user of the user device 310 can have seen a doctor such as a psychiatrist related to the treatment of one or more forms of mental instability (or potential mental instability). Based on such an appointment, the doctor can evaluate the user of the user device 310 for one or more symptoms of one or more forms of mental instability and provide a diagnoses of a particular form of mental instability. In such implementations, the input engine 332 can process the received diagnoses and adjust weights of one or more features of the feature vector 332*a* based on the diagnosis. To determine the set of features corresponding to a diagnosis, the user device 310 can using a mapping table to, for example, map the diagnosis (e.g., a form of mental instability) to one or more features.

By dynamically weighting the features of feature vector 332*a* as described above, the system 300 can more accurately predict when a user is exhibiting forms of mental instability. This enables the system 300 to being to identify and implement mitigating actions to help the user from hurting others or himself/herself. Absent such dynamic weighting, it is possible for certain features of the input content 312 to be unintentionally muted or diluted amongst the input content 312 received, thus masking the presence of certain symptoms of one or more forms of mental instability.

The input vector 332*a* can be provided as an input to the machine learning model 333. The machine learning model 333 is trained to predict a likelihood that a user of the user device 310 is exhibiting one or more forms of mental instability based on processing of input data input content 312 from the user device 310. In some implementations, the input content 312 can include message content of a message sent from a first user to a second user. The machine learning model 333 can include any type of machine learning model that can be trained to generate output data capable of being used to classify an input data into one of multiple different classifications. In some implementations, for example, the machine learning model 333 can be trained to classify input content data from a user device 310 into one or more classes corresponding to forms of mental stability or instability. In some implementations, examples classes can include mentally stable, mentally unstable, depressed, schizophrenic, bipolar, suicidal, or any combination thereof. In some implementations, the machine learning model 333 can include one or more neural networks.

The machine learning model 333 can be trained using a training data item data set of labeled training data items. In some implementations, for example, each training data item can be an example of input content labeled as corresponding to (i) one or more forms of mental instability or (ii) mentally stable (or, e.g., no mental instability). If the training input content is not yet converted into a feature or numerical representation of the training input content, the training input content can be converted into a feature or numerical representation of the training input content prior to inputting the training representation of the input content into the machine learning model 333.

Features of such input content can to be numerically representing during feature extraction can include representations of message content (e.g., text, image, audio, video, or a combination), social media post content (e.g., text, image, audio video, or a combination), content referenced by a URL shared by the user via a message application or social media post, content a user is or has read on the user device 310, content a user is or has watched on the user device 310, an amount of time the user has stared at a computer screen of the user device 310 without moving the user device 310, features of a selfie image of the user of user device captured by the user device 310 while the user using a messaging application to transmit one or more message, features of a selfie image of the user of user device 310 captured by the user device 310 while the user uses a social media application to post content or interact with content, an amount of pressure applied by a user when tapping on a device as detected by device sensors while using a messaging application or social media application, data indicating vocal outbursts exceeding a threshold decibel level while using an application (e.g., messaging application, social media application or site, gaming application, or the like), sensor data indicating that the user device 310 was recently thrown, or any combination thereof.

However, there is no requirement that training data items or actual input content received in real time and processed through a trained machine learning model are required to have such features. Instead, training data items used to train the machine learning model can include any combination of features including one or more of any data that can be collected from a user device describing a property or attribute of a user's use of the user device. Alternatively, in some implementations, a training input content data item can be generated by a simulator and simulator can assign a label indicating whether the training input content data item corresponds to (i) one or more forms of mental instability or (ii) mentally stable (or, e.g., no mental instability).

Once the set of training data items comprising a set of labeled input content data is acquired, the machine learning model 333 can be trained, prior to execution of the example of FIG. 3, to predict a likelihood that a user of the user device 310 is exhibiting one or more forms of mental instability based on processing of input data input content 312 from the user device 310. This training is achieved by obtaining a labeled training input content data, providing the input content data through the machine learning model 333, processing the training input content data through the machine learning model 333 to generate output data, comparing the output data generated by the machine learning model 333 to the label for the training input content data processed through the machine learning model 333, and adjusting one or more parameters of the machine learning model 333 based on the differences between the output generated by the machine learning model 333 based on the machine learning model's processing of the training input content data and the label for the training input content data processed by the machine learning model 333. The training process can continue to iteratively process input content data through the machine learning model 333 in this manner until the differences between output data generated by the machine learning model 333 for processed training input content data and the label for such training input content data falls within a predetermined difference threshold. Once the output data generated by the machine learning model 333 based on the machine learning model 333 processing a training input content data begins to satisfy a predetermined difference threshold, then the machine learning model 333 can be considered to be trained.

For purposes of the system of FIG. 3, the "input content data" can include a labeled set of features that have been extracted from input content or the input content itself. The input content can include numerical representations of message content (e.g., text, image, audio, video, or a combination), social media post content (e.g., text, image, audio video, or a combination), content referenced by a URL shared by the user via a message application or social media post, content a user is or has read on the user device 310, content a user is or has watched on the user device 310, an amount of time the user has stared at a computer screen of the user device 310 without moving the user device 310, features of a selfie image of the user of user device captured by the user device 310 while the user using a messaging application to transmit one or more message, features of a selfie image of the user of user device 310 captured by the user device 310 while the user uses a social media application to post content or interact with content, an amount of pressure applied by a user when tapping on a device as detected by device sensors while using a messaging application or social media application, data indicating vocal outbursts exceeding a threshold decibel level while using an application (e.g., messaging application, social media application or site, gaming application, or the like), sensor data indicating that the user device 310 was recently thrown, or any combination thereof. Features of such input content can include any features extracted from input content.

At runtime, during the inference stage, the trained machine learning model 333 can obtain the input vector 332a, process the input vector 332a through each layer of the machine learning model 333, and generate, based on the process of input vector 332a, output data 333a indicating likelihood that a user of the user device 310 is exhibiting one or more forms of mental instability based on processing of input data input content 312 from the user device 310.

The evaluation engine 334 can obtain the output data 333a and determine, based on the output data 233a, whether the user of the user device 310 is exhibiting one or more forms of mental instability. Such a determination, by the evaluation engine 334, can include, for example, comparing the output data 333a to one or more thresholds. In some implementations, based on a determination that the output data 333a satisfies one or more thresholds, the evaluation engine 334 can generate output data 334a indicating that the user 310 is exhibiting one or more forms of mental instability. Alternatively, if the evaluation engine 334 determines that the output data 333a does not satisfy at least one threshold of the one or more thresholds, then the evaluation engine 334 can generate output data 334a indicating that the user 310 is not exhibiting one or more forms of mental instability. In some implementations, when the evaluation engine 334 determines that the output data 333a does not satisfy any thresholds, the evaluation engine 334a can terminate execution of the system 300.

In some implementations, the evaluation engine 334 can be configured to define different levels of mental stability or instability using one or more thresholds. As a simple example, assume that the output data 333a generated by the machine learning model 333, based on processing an input vector 332a that represents input content data collected from a user device 310, is a probability represented by a numerical value between 0 and 1. In such implementations, the evaluation engine can establish a first classification of greater than 0 and less than 0.33 corresponding to a mentally stable individual and a second superset classification of greater than 0.33 and less than 1 corresponding to mentally unstable individuals. Moreover, the superset classification of 0.33 to 1 can be broken into subsets using different thresholds such as greater than 0.33 to 0.66 corresponding to depressed individuals and greater than 0.67 and less than 1 corresponding to suicidal individuals. Then, the machine learning model 333 can be configured to generate output data 333a that classifies a user of user device 312 into one of these categories based on the value of the output data 333a produced by the machine learning model 333. In such implementations, the machine learning model can be trained on input content data labeled as either mentally stable, depressed, or suicidal until the machine learning model classifies input content data into one of the three respective categories within a predetermined amount of error. While three categories are described in this example, the present disclosure is not so limited. Instead, the machine learning model can be trained to classify input content data into any number of difference classifications defined by any number of thresholds using the evaluation engine 334.

Mitigation engine 335 can obtain output data 334a generated by the evaluation engine 334 and determine whether one or more mitigating operations are to be performed. In some implementations, for example, the output data 334a can indicate that the user of the user device 310 is mentally stable. In such implementation, the mitigation engine 335 may not perform any remedial operations and execution of the system 300 may terminate. However, in other implementations, the mitigation engine 353 may obtain output data 334a indicating that the user of the user device 310 is likely exhibiting one or more forms of mental instability. In such implementations, the mitigation engine can cause one or more mitigating operations to be performed.

For example, in some implementations, the mitigation engine 335 can determine, based on the output data 334a, that the user of the user device 310 is exhibiting a form of mental instability such as depression, suicidal thoughts, or the like. In such implementations, the mitigation engine 335 can instruct 335a the output engine 336 to generate a notification 336a that, when processed by the user device 310, enables the user device 310 to access, obtain, or view content, or a link to content, that can help the user of the user device 310 improve the user's level of mental stability (e.g., improve the user's mood, improvement user's level of happiness, reduce the occurrence of suicidal thoughts, or the like). The content that is provided, or linked to, can provide instant feedback to the user of the user device 310 to encourage the user to be positive, communicate to the user a message about the user's self-worth/importance, or the like.

In some implementations, the mitigation engine 335 can instruct 335a the output engine 336 to generate a notification that, when processed by the user device 310, can cause the user device 310 to display images, videos, or both, from a happy, positive, or encouraging memory stored on the user device 310. Such a memory can include a series of images, audio, video, text, or a combination thereof stored, for example, by a photo management application on the user device 310. Viewing, by a user that may be suicidal, a happy memory may cause the user to (i) transition from a depressed state or mood to a happy/positive state or mood, (ii) reconsider suicidal thoughts or behavior, or (iii) a combination thereof. In some implementations, if the user has a medical history of depression or suicidal behavior, family and friends of the user can record encouraging messages for the user that can be triggered, by the mitigation engine 335 and/or output engine 336, as a remedial operation when the user is determined, by the system 300, to be exhibit a form of mental instability such as suicide or depression. In some implementations, the family or friends of the user can help create specific content for specific symptoms of a form of mental instability that can be particularly triggered by the mitigation engine 335 and/or the output engine 336 when the particular form or mental instability is detected.

For example, a teenager may use a user device 310 to (i) view content about their parents hating them, (ii) message a friend using a text message "I'm going to kill myself, cause my parents hate me, or (iii) both. In such a scenario, the input content data 312 including the viewed content, the message, or both, can be processed through the system 300, have features extracted, and a feature vector representing that content provided as an input to the machine learning model 333. In such implementations, the machine learning model 333 can be trained to generate output data 333a, that when evaluated by the evaluation engine 334, results in the teenager being classified into a classification of family-related suicidal thoughts. Based on output data 333a, the mitigation engine 335 can instruct 335a the output engine 336 to trigger display of a video from the teenager's parents that includes playback of a message, to the teenager, telling the teenager that the teenager's parents love the teenager and will always love the teenager no matter what. The output engine 336 can generate a notification (or other instructions) 336a that, when processed by the user device 310, cause the user device to playback the video, of the parents and their message, to the teenager using user device 310 to help transition the teenager's mindset, mood, emotions, the like, or a combination, from a mentally instable state to a mentally stable state using content that is pre-recorded with a particular message to target a particular form of mental instability detected by the system 300. In some implementations, the message from the parents may be stored in a remote computer and the teenager may not even know such message was recorded. In such instances, the notification (or instructions) provided by the output engine to the user device 310 via the network 320 can include instructions for the user device 310 on how to message from the parents. Such remote and/or discrete storage of the content used to address a particular form of mental instability of the user may be beneficial, because it cannot give the user (e.g., the teenager) the opportunity to delete the custom content (e.g., video from parents) generated to treat a particular form of mental instability.

The aforementioned example of content provided to the user of a user device to treat a particular form of mental instability is not limited to custom records from family members. Instead, it can include other types of content. For example, in some implementations, the user of the user device can include a father, who is the bread winner of his family, being depressed harassed by his employer. The father may (i) view web content related to employment discrimination, (ii) text a friends saying "the constant harassment from Mr. Smith has me depressed and I'm not sure what to do," or (iii) both. In such a scenario, the input content data 312 including the viewed content, the message, or both, can be processed through the system 300, have features extracted, and a feature vector representing that content provided as an input to the machine learning model 333. In such implementations, the machine learning model 333 can be trained to generate output data 333a, that when evaluated by the evaluation engine 334, results in the teenager being classified into a classification of job-related depression. Based on output data 333a, the mitigation engine 335 can determine the father's profession (e.g., based on a user profile) and instruct 335a the output engine 336 to generate and transmit a notification 336a to the user device 310 of the father that includes a list of job postings related to the father's profession, content or a link to content about how to handle job-related harassment, a message of encouragement, or a combination thereof.

The aforementioned examples selection of content specific to a user's determined form of mental instability are meant to be examples and not limiting. Instead, they are meant to highlight functionality related to detecting a particular type of mental instability and targeting that particular type of mental instability with specific content to remedy the particular type of mental instability.

In other implementations, the mitigations engine 335 can cause the output engine 336 to generate and transmit a link to a live appointment with a psychologist to the user device 310. In some implementations, the In some implementations, the mitigation engine 335 can additionally, or alternatively, cause the output engine 336 to notify one or more other parties such as an emergency contact, family member, neighbor, law enforcement, fire department, or a combination thereof, that the user of the user device 310 is likely suicidal.

The aforementioned remedial operations function to help protect a user of the user device 310 that is determined to exhibit a form of mental instability, to improve the mental stability of the user, or a combination of both. However, the present disclosure is not limited to remedial operations targeting the user having mental instability. Instead, in some implementations, the remedial operations triggered by the mitigation engine 335 and executed by the output engine 336 can be designed to protect other users from hurtful content that may be spread by the user of the user device 310.

For example, in some implementations, a user that is suffering from one or more forms of mental instability may be short-tempered and/or become angry with others. Given the user's instable mental state, the user may lash out at others. Accordingly, the mitigation engine 335 can, in some implementations, cause content screening of the user's messages (e.g., text message, audio messages, video messages, multimedia messages, or the like). Such messages may be sent via one or more direct messaging applications that enable a user to communicate with one or more other users such as SMS messaging, MMS messaging, iMessage, WhatsApp, direct messages in a social media platform, or the like. Alternatively, such messages may include, for example, posts on a social media platform, comments on a social media platform, or the like.

Accordingly, in some implementations, the mitigation engine 335 can determine based on output data 334a from the evaluation engine 334 that the user of user device is suffering from one or more forms of mental instability. In such instances, the mitigation engine 335 can instruct 335a the output engine 336 to instruct 336a the user device 312 to being screening message content entered into the user device 312 by the user while the system 300 is generating output data 333a based on processing input content 312 from the user device 310 indicating that the user of the user device 310 is suffering from one or more forms of mental instability.

The user device 310 can perform content screening in a number of different ways with different levels of interference on the user's ability message. In some implementations, the mitigation engine 335 can, based on output data 134a from the evaluation engine 334, determine that the user of user device is exhibiting symptoms of mental instability. In such implementations, the mitigation engine 335 can instruct 335a the output engine 336 to transmit data 336a to the user device 310 that cause the user device 310 to generate pre-emptive prompts prior to sending message while the user is determined to be in a state of mental instability. The pre-emptive prompts can notify the user of the user device 310 that the user may be suffering from a form of mental instability and prompt the user to rethink, or otherwise reconsider, sending the message while suffering from a form of mental instability. In such instances, the user is still permitted to communicate freely, but prompted as to the user current mental state and to reconsider communicating with others.

In some implementations, the user device 310 may be configured by mitigation engine 335 and/or the output engine 336 via a notification and/or instruction 336a to have the user's input messages content screened while the user is determined, by system 300, to be suffering from a form of mental instability. In such instances, content screening may occur in real time as the user enters text, audio, video, or a combination thereof, into the user device 310. In other implementations, the content screening can occur after content is entered and when (or after) the user hits "send," "submit," or other command to attempt to send the message. In any either of these scenarios, the user device may perform the content screening. In the latter scenario, a network computer may, alternatively or in addition, receive the content and perform the screening. In such implementations, it is only after the message content input by the user is determined to include offensive content that the user device prompts the user to notify the user of the user's detected state of mental instability, prompts the user to rethink, or otherwise reconsider, sending the message content, or both.

In yet other implementations, the mitigation engine 335 and/or the output engine 336 can configure the user device 310 to perform content screening of outgoing message content once the user is determined to be exhibiting a form of mental instability and then screen all message content outgoing from the user device that is determined to include offensive content without prompting the user to rethink, or otherwise reconsider.

While it may be beneficial to screen outgoing messages from the user device of a user determined to be exhibiting a form of mental instability, there are also associated risks such as, for example, a user may be limited from contacting emergency support. Accordingly, in some implementations, even a message prompting the user to rethink may include a link to contact 911, one or more family members, an emergency contact, or the like.

In yet another implementation, the mitigation engine 335 or output engine 336 can configure the user device to route a blocked message that the user suffering mental instability tried to send, but was blocked due to content screening from an intended recipient, to another recipient for emergency viewing. For example, assume a user suffering from mental instability tried to send a message to a classmate saying "I hate you tramp for spreading lies and now I'm gonna kill myself." In such implementations, the system 300 can detect that the user of user device 300 is suffering from a form of mental instability (e.g., suicidal thoughts), the mitigation engine 335 and/or output engine 336 can cause the message to the classmate from being delivered to the classmate using one of the techniques described above, but then route the offensive content to another user device of a predetermined contact. Such a predetermined contact can be a trusted person who is aware of the mental stability issues with the user of user device 310. In such implementations, the predetermined contact can receive an alert and the offensive message content, review the message content, and try to take action to prevent the user of the user device 310 from committing suicide. In some implementations, the alert can be accompanied by audio sounds, haptic feedback, visual notifications, or any combination, to get the predetermined contact's attention. In some implementations, the alert can include, or otherwise make available, quick links to police contact(s), a fire department contact(s), a doctor (e.g., psychologist) contact, a social worker contact, the user's contact information, or the like, which upon their selection, automatically makes a call to the particular contact. Such links can be visual (e.g., hyperlink or visual button) or audio (e.g., output saying "to call police say 'police' now" and detect user input via a microphone). In some implementations, for example, the alert can provide a link, visual button, audio prompt, or combination thereof, via the user device of the predetermined contact to trigger the immediate playback of content such as audio, images, video, text, or any combination thereof, on the user device 310. Such content can include happy memories of content on the user device 310 that remind the user of the user device 310 that the user is loved. Such content can be generated memories in a photo or video application of the user device, favorited images or video in a photo or video application of the user device, pre-recorded content by the predetermined contact (or other user (e.g., a family member, close friend, or social worker)) that includes content explaining that the user of the user device is loved.

The output engine 336 works in conjunction with the mitigation engine 335 to cause one or more remedial operations to be performed after a user of the user device 310 is determined to be exhibiting a form of mental instability. In general, the mitigation engine 335 can select one or more remedial operations to be performed and then instruct the output engine 336 to generate notifications, instructions, or other data referred to here as 336a that cause the selected one or more remedial operations to be implemented. While the present disclosure describes the mitigation engine 335 and the output engine 336 as being different engines, the mitigation engine 335 and the output engine 336 can also be implemented as a single engine. Thus, the distinction between the mitigation engine 335 and the output engine 336, and any other engines or models described herein, may be more of a logical difference than a physical difference.

FIG. 4 is a flowchart of an example of a process 400 for mitigating distribution of offensive content based on a determination that a user of a user device is exhibiting one or more forms of mental instability. For convenience, the method 400 will be describe below as being performed by a system such as the system 300.

A system can begin execution of the process 400 by using one or more computers to obtain first data corresponding to message content of a first message that was transmitted by a first user device (410).

The system can continue execution of the process 400 by using one or more computers to generate input data for input to a machine learning model based on the obtained first data (420).

The system can continue execution of the process 400 by using one or more computers to provide the generated input data as an input to a machine learning model that has been trained to predict a likelihood that a user of the first user device is exhibiting one or more forms of mental instability based on processing of input data corresponding to message content of a message sent from a first user to a second user (430).

The system can continue execution of the process 400 by using one or more computers to process the provided input data through each layer of the machine learning model to generate output data indicating a likelihood that the user of the first user device is exhibiting one or more forms of mental instability (440).

The system can continue execution of the process 400 by using one or more computers to determining, using one or more computers, whether the provided input data corresponding to the message content of the first message is indicative of a user that is exhibiting one or more forms of mental instability based on the generated output data (450).

Based on a determination by the system at stage 450 that the provided input data corresponding to the message content of the first message is indicative of one or more forms of mental instability, the system can continue performance of the process 400 by using one or more computers to perform a remedial operation to mitigate exposure of other users to the message content from a user of the first user device (460).

In some implementations, the performance of a remedial operation at stage 460 can include the system using one or more computers to generate notification data for transmission to the first user device that, when processed by the first user device, prompts the particular user to reconsider instructing the first user device to communicate subsequent message content to another user device.

In some implementations, the performance of a remedial operation at stage 460 can include the system using one or more computers to provide second data corresponding to subsequent message content from the first user device for content screening prior to output of the subsequent message content by a second user device. Next, the system can determine whether the provided second data includes offensive content. Then, in some implementations, only after a determination that the provided second data includes offensive content, the system can continue execution of the process 400 by using one or more computers to generate notification data for transmission to the first user device that, when processed by the first user device, prompts the particular user to reconsider instructing the first user device to communicate subsequent message content to another user device.

In some implementations, the performance of a remedial operation at stage 460 can include the system using one or more computers to provide second data corresponding to subsequent message content from the first user device for content screening prior to output of the subsequent message content by a second user device. Next, the system can determine whether the provided second data includes offensive content. Then, in some implementations, only after a determination that the provided second data includes offensive content, prohibiting, output of a message including the subsequent message content on the second user device.

In some implementations, the performance of a remedial operation at stage 460 can include the system using one or more computers to generate notification data for transmission to the first user device that, when processed by the first user device, (i) notifies the user of the first device that one or more forms of mental instability have been detected and (ii) prompts the particular user to consult one or more resources for treating the one or more symptoms. In some implementations, the one or more resources can include an emergency contact, a health professional, or one or more links to network resources.

In some implementations, the machine learning model can include one or more neural networks.

FIG. 5 is a flowchart of an example of a process 500 for dynamic feature weighting in a system for mitigating distribution of offensive content. For convenience, the method 500 will be describe below as being performed by a system such as the system 300.

A system can begin execution of the process 500 by using one or more computers to obtain data that identifies one or more symptoms of mental instability associated with a particular entity (510).

The system can continue execution of the process 500 by using one or more computers to adjust, based on the obtained data, weights corresponding to one or more fields of a feature vector representing features extracted from user content based on the obtained data (520).

The system can continue execution of the process 500 by using one or more computers to provide the feature vector as an input to a machine learning model that has been trained to determine a likelihood that a user is exhibiting one or more forms of mental instability based on processing usage data collected from a user device of an entity (530).

The system can continue execution of the process 500 by using one or more computers to process the feature vector through the machine learning model to generate output data indicating a likelihood that the particular entity is exhibiting one or more forms of mental instability (540).

The system can continue execution of the process 500 by using one or more computers to determine whether the particular entity is exhibiting one or more forms of mental instability based on the generated output data (550).

Then, based on a determination by the system at stage 550 that the particular entity is exhibiting one or more forms of mental instability, the system can continue execution of the process 500 by performing one or more operations to mitigate the impact of the one or more forms of mental instability on the particular entity or other entities (560).

Figure 6:
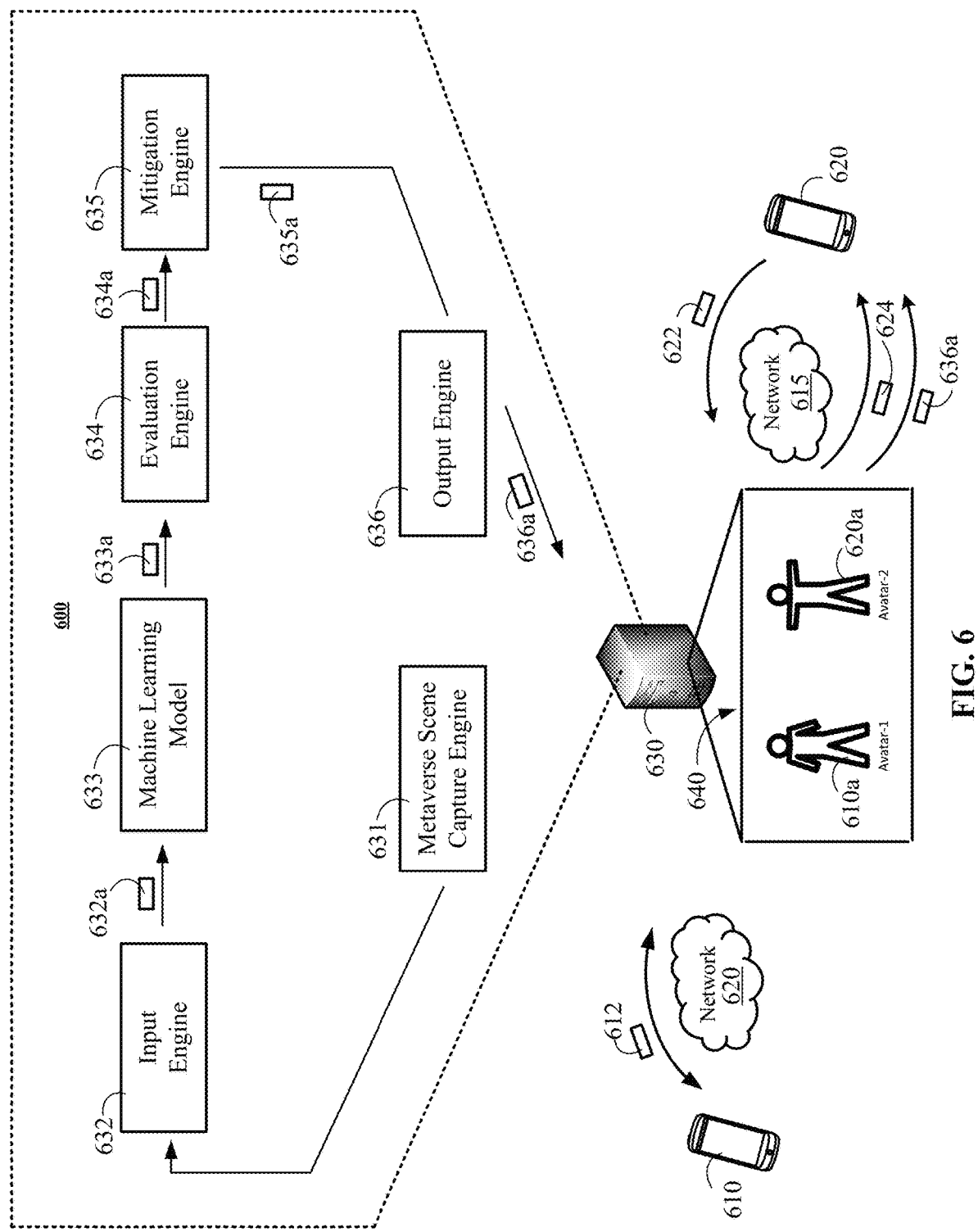
FIG. 6 is a diagram of an example of a system of mitigating offensive behavior in a metaverse environment.

FIG. 6 is a diagram of an example of a system 600 of mitigating offensive behavior in a metaverse environment. The system 600 can include a user device 610, a network 615, and an application server 630. The user device 610 is generally the same type of user device as user device 110 of FIG. 1 or 310 of FIG. 3, the network 615 can generally be of the same type of network as network 115 or network 320, and the application server 630 can generally be the same type of application server as application server 130 or 330. However, in the example of FIG. 6, the user device 610 and the application server 630 are configured with different processing engines, models, and/or capabilities. Such engines, models, and/or capabilities may be alternative engines, models, and/or capabilities than those described with respect to FIG. 1 and/or FIG. 3 or additional engines, models, and/or capabilities to those described with respect to FIG. 1 and/or FIG. 3.

In the example of FIG. 6, the application server 630 can be configured to include a metaverse scene capture engine 631, an input engine 632, a machine learning model 633, an evaluation engine 6534, a mitigation engine 635, and an output engine 636.

Respective users of user devices 610 and 620 may use the user devices 610, 620 to virtually enter into a metaverse environment 640. The metaverse environment can include, for example, a virtual reality environment where an avatar 610a, 620a for each user of user devices 610, 620 can be created to interact responsive to input from the user devices 610, 620, respectively. In some implementations, the user device 610 can be smartphone that is inserted into a virtual reality headset. In other implementations, the user device 610 can be a virtual reality client devices such as a headset or goggles that are configured to be worn by a user. In either scenario, the display of the user device 610 is oriented in a headset in a manner that creates a virtual immersion of the user of the user device 610 in the metaverse environment 610a. a user of user device 610 may also wear gloves, shoes, shirts, pants, or other objects having sensors that communicate with the user device 610 and cause sensor data 612 to be transmitted to the application server 630 to be processed into behavior of the avatar 610a such that when the user of user device 610 moves, the corresponding avatar 610a moves in a corresponding manner in near real-time, with the delay being minimal and typically comprising the delay required to transmit the sensor data indicating the user of user device's 610 movement and processing of the sensor data by the application server to generate a rendering of the movement. Likewise, the user device 610 can also include one or more microphones that can capture utterance of a user of the user device 610, and transmit them to the application server 630. Then, the application server 630 can process the utterance and cause the avatar 610a to utter the utterance. The user device can include the same features as the user device 610 herein, but the avatar-2 620 will exhibit movement and utterances corresponding to sensor data or utterances 622 of the user of user device 620 transmitted to the application server.

The user device 610, 620 can respectively receive data 614, 624 that, when processed by each respective user device 610, 620, enables the respective user devices 610, 620 to create an virtual metaverse such that the user of a first user device 610 can interact with a user of a second user device 620 by having their respective movements and utterances projected onto their respective avatars. In such a virtual metaverse environment, since each respective avatar 610a, 620a mimics the movements and utterances of the respective users of user devices 610, 620, if the user of a user device such as the user of user device 620 performance an offensive gesture or utters an offensive utterance, the avatar 620a of the user of user device 620 will also perform the offensive gesture or utter the offensive utterance. The offensive gesture, offensive utterance, or a combination of both may be referred to as offensive behavior. Accordingly, aspects of the present disclosure are directed towards monitoring a metaverse environment in order to detect such offensive behavior and mitigate the effects of such offensive behavior.

The metaverse scene capture engine 631 can monitor a metaverse environment 640 and capture representations of a metaverse scene. A metaverse scene can include a snapshot of a metaverse environment at any particular point in time. In some implementations, the metaverse scene capture engine 631 can be configured to periodically capture metaverse scene. Such periodic capturing of a metaverse scene can include, for example, capturing a metaverse scene every second, ever 30 seconds, ever minute, every 5 minutes, or any other period of time that is less than or greater than one or more of the timer periods mentioned here. In some implementations, periodic metaverse scene captures can occur so fast, for example, every 30 millisecond's, or less, that the periodic metaverse scene captures essentially perform continuous monitoring of the metaverse environment.

In some implementations, a metaverse scene be a two-dimensional image depicting a scene of a metaverse environment at the time the impact was captured. In some implementations, the metaverse scene may be captured as a three-dimensional image that depicts the depth of the scene of a metaverse environment. In such implementations, the metaverse scene may include only a visual representation without audio.

In some implementations, the metaverse scene can include a video capture of period of time in the metaverse. In such implementations, the metaverse scene may have video and audio of a period of time in the metaverse. In yet other implementations, the metaverse scene can include an audio capture of a period of time in the metaverse. In such implementations, the metaverse scene may have audio of a period of time in the metaverse, without audio or video.

In some implementations, the aforementioned captures can be captured in a number of different ways. For example, in some implementations, a metaverse scene can be captured as a screen shot of a display of a user device 610, 620, or both, as the users of the user device 610, 620, or, both are participating in the metaverse environment 640. In some implementations, the metaverse scene can be captured as display recording of a display of a user device 610, 620, or both, as the users of the user device 610, 620, or both, are participating in the metaverse environment 640. Additionally, or alternatively, audio of the metaverse environment 640 can also be captured alone or in combination with one or more recordings of a display of a user device 610, 620. In some implementations, one or more other user devices can be set up as metaverse monitors. That is, for example, the user device can be set up to view and hear what is occurring in a metaverse environment 640 and capture screenshots of the display showing the metaverse environment 640, capture recordings of the display showing the metaverse environment 640, capture audio of the metaverse environment 640, or a combination thereof.

However, the present disclosure should not be limited to such methods of capturing a metaverse scene. For example, in some implementations, a stream of data corresponding to the metaverse scene can be obtained and then metaverse scene capture engine 631 can decode the stream of data corresponding to the metaverse scene and capture images, videos, audio, or a combination thereof, from the decoded metaverse scene.

The metaverse scene capture engine 631 can provide the captured metaverse scene as an input to the input engine 632. The input engine is configured to obtain the metaverse scene and generate an input 632a to the machine learning model 633 based on the received metaverse scene. For example, the input engine 632 is configured to extract features of the captured metaverse scene 631a and generate a feature vector input 632a that numerical represents the metaverse scene 631a. In some implementations, the vector vocabulary can, for example, correspond to field for each pixel of the captured metaverse scene. Alternatively, or in addition, the vector vocabulary may have fields corresponding to words that can be uttered. In some implementations, the vector vocabulary could include a large number of words including, for example, all known words of one or more languages. In some implementations, the vector vocabulary can include only words corresponding to know words or phrases that include offensive content, offensive meaning or sentiment, or a combination thereof. Accordingly, the input vector can include fields corresponding to visual features, audio features, or both. In some implementations having three-dimensional images, the input 632a generated by the input engine 632 can be a voxel representation of the metaverse scene 640. The input engine 632a can then provide input 632a, which is a numerical representation of the captured metaverse scene 631a, as an input to the machine learning model 633.

The machine learning model 633 can process the input 632a through the machine learning model 633 to generate output data 633a. In the example of FIG. 6, the machine learning model 633 is trained to predict a likelihood that data representing features of a scene in a metaverse environment is indicative of offensive behavior. The machine learning model 633 can include any type of machine learning model that can be trained to generate output data capable of being used to classify data representing features of a scene in a metaverse environment into one of multiple different classifications. In some implementations, for example, the machine learning model 633 can be trained to classify data representing features of a scene in a metaverse environment from a user device such as user device 610 or 620 into one or more classes corresponding to (i) an offensive metaverse scene or (ii) a non-offensive metaverse scene. In some implementations, the machine learning model 633 can include one or more neural networks.

The machine learning model 633 can be trained using a training data item data set of labeled training data items. In some implementations, for example, each training data item can be an example of a captured metaverse scene labeled as corresponding to (i) an offensive metaverse scene or (ii) a non-offensive metaverse scene. If the training representation of the metaverse scene is not yet converted into a feature or numerical representation of the metaverse scene, the training representation of the metaverse scene can be converted into a feature or numerical representation of the metaverse scene prior to inputting the training representation of the metaverse scene into the machine learning model 633. For three dimensional representations of the metaverse scene, the numerical representations of the metaverse scene can include voxel representations of metaverse scene and the machine learning model 633 can be trained on voxel representations of training metaverse scenes.

In some implementations, the labeled input content data can include a labeled set of features that have been extracted from input content. Features of such input content to be numerically represented during feature extraction can include pixels of the captured metaverse scene, words or phrases uttered in the metaverse scene, or a combination thereof. An example of offensive content in a metaverse environment may include, for example, a metaverse scene showing an avatar 620a "mooning" another avatar, a metaverse scene showing an avatar 620a giving a "middle finger" to another avatar, a metaverse scene showing an avatar 620a raising its first to another avatar, a metaverse scene having audio of an avatar uttering a curse word, a metaverse scene having audio of an avatar saying "I hope you die," a metaverse scene having audio of an avatar saying "you are a loser," or the like. In short, any behavior that is likely to be offensive outside the metaverse is also like to be offensive in the metaverse. A non-offensive metaverse scene can be any metaverse scene include behavior that is not offensive such as two or more avatars talking, two or more avatars cooperatively working a virtual environment, two or more avatars playing a virtual sport. In short, any behavior that is likely to be not-offensive outside the metaverse is also like to be not-offensive in the metaverse.

Once the set of training data items comprising a set of labeled metaverse scenes is acquired, the machine learning model 633 can be trained, prior to execution of the example of FIG. 6, to predict a likelihood that data representing features of a scene in a metaverse environment is indicative of offensive behavior. This training is achieved by obtaining a labeled training metaverse scene, providing the metaverse scene through the machine learning model 633, processing the training metaverse scene through the machine learning model 633 to generate output data, comparing the output data generated by the machine learning model 633 to the label for the training metaverse scene processed through the machine learning model 633, and adjusting one or more parameters of the machine learning model 633 based on the differences between the output generated by the machine learning model 633 based on the machine learning model's processing of the training metaverse scene and the label for the training metaverse scene processed by the machine learning model 633. The training process can continue to iteratively process training metaverse scenes through the machine learning model 633 in this manner until the differences between output data generated by the machine learning model 633 for processed training metaverse scenes and the label for such training metaverse scenes falls within a predetermined difference threshold. Once the output data generated by the machine learning model 633 based on the machine learning model 633 processing a training metaverse scene begins to satisfy a predetermined difference threshold, then the machine learning model 633 can be considered to be trained.

At runtime, during the inference stage, the trained machine learning model 633 can obtain the input vector 632a representing an actual metaverse scene, process the input vector 632a through each layer of the machine learning model 633, and generate, based on the process of input vector 632a, output data 633a indicating likelihood that input vector 632a representing a scene in a metaverse environment is indicative of offensive behavior.

The evaluation engine 634 can obtain the output data 633a and determine, based on the output data 633a, whether the data representing features of a scene in a metaverse environment is indicative of offensive behavior. Such a determination, by the evaluation engine 634, can include, for example, comparing the output data 633a to one or more thresholds. In some implementations, based on a determination that the output data 633a satisfies one or more thresholds, the evaluation engine 634 can generate output data 634a indicating that the data 632a representing features of a scene in a metaverse environment is indicative of offensive behavior. Alternatively, if the evaluation engine 634 determines that the output data 633a does not satisfy at least one threshold of the one or more thresholds, then the evaluation engine 634 can generate output data 634a indicating that the data representing features of a scene in a metaverse environment is not indicative of offensive behavior. In some implementations, when the evaluation engine 634 determines that the output data 633a does not satisfy any thresholds, the evaluation engine 634a can terminate execution of the system 600.

Mitigation engine 635 can obtain output data 634a generated by the evaluation engine 634 and determine whether one or more mitigating operations are to be performed. In some implementations, for example, the output data 634a can indicate that the data 632a representing features of a scene in a metaverse environment is not indicative of offensive behavior. In such implementation, the mitigation engine 635 may not perform any remedial operations and execution of the system 600 may terminate. However, in other implementations, the mitigation engine 653 may obtain output data 634a indicating that the data 632a representing features of a scene in a metaverse environment is indicative of offensive behavior. In such implementations, the mitigation engine can cause one or more mitigating operations to be performed.

For example, in some implementations, the mitigation engine 335 can determine, based on the output data 334a, that the data 632a representing features of a scene in a metaverse environment is indicative of offensive behavior.

For example, in this example, assume the metaverse scene processed by the machine learning model 633 includes avatar-2 620a, which corresponds to the user of user device 620, performing offensive behavior. First, the mitigation engine 635 can determine a user device 620 that corresponds to the avatar-2 620a. In some implementations, for example, the mitigation engine 635 may have access to an avatar-to-user-device mapping table. The mitigation engine 635 can then use the avatar-to-user-device mapping table to determine the user device 620 for the avatar-2 620a.

After determining the user device corresponding to the avatar-2 620a that was performing offensive behavior in the metaverse scene processed by the system 600, the mitigation engine 335 can instruct 635a the output engine 636 to generate notification data 636a for transmission, via network 615, to a user device 620 of the particular user corresponding to avatar-2 620a that, when processed by the user device 620, prompts of the user device 620 to stop the offensive behavior. In some implementations, the notification data, when processed by the user device 620, can cause the user device 620 to display a visual notification in the display of the user device 620 that prompts the particular user of the user device 620 to stop the offensive behavior. Alternatively, or in addition, in some implementations, the notification data, when processed by the user device 620, can cause the user device 620 to output an audio notification from one or more speakers of the user device 620 that prompts the user of the user device 620 to stop performing the offensive behavior.

However, the present disclosure is not limited to remedial operations to reduce offensive behavior in a metaverse environment by prompting an offending user and asking the offending user to stop performing offensive behavior. For example, in some implementations, the mitigation engine 635 can instruct 635a the output engine to mute audio from the avatar-2 620a corresponding to the user of the user device 620 in the metaverse environment.

By way of another example, in some implementations, the mitigation engine 635 can instruct 635a the output engine 636 to obfuscate a visual representation of the avatar-2 620a corresponding to the user of the user device 620 in the metaverse environment. In other implementations, the mitigation engine 635 can instruct 635a the output engine 636 to replace a visual representation of the avatar-2 620a corresponding to the user of the user device 620 that has caused the avatar-2 620a to perform offensive behavior with a different avatar-2 620a indicating that the user 620 is performing offensive behavior. For example, in some implementations, the avatar-2 620a of the misbehaving user could be replaced with a devil avatar.

For example, in some implementations, the mitigation engine 635 can instruct 635a the output engine 636 to remove a visual representation of the avatar-2 620a corresponding to the user of the user device 620 in the metaverse environment.

The output engine 636 works in conjunction with the mitigation engine 635 to cause one or more remedial operations to be performed after data 632a representing features of a scene in a metaverse environment is determined to be indicative of offensive behavior. In general, the mitigation engine 635 can select one or more remedial operations to be performed and then instruct the output engine 636 to generate notifications, instructions, or other data referred to here as 636a that cause the selected one or more remedial operations to be implemented. While the present disclosure describes the mitigation engine 635 and the output engine 636 as being different engines, the mitigation engine 635 and the output engine 636 can also be implemented as a single engine. Thus, the distinction between the mitigation engine 635 and the output engine 636, and any other engines or models described herein, may be more of a logical difference than a physical difference.

FIG. 7 is a flowchart of an example of a process 700 for mitigating offensive behavior in a metaverse environment. For convenience, the process 700 will be described as being performed by a system such as system 600.

A system can begin performance of a process 700 by using one or more computers to obtain data representing features of a scene in a metaverse environment, where the scene in the metaverse environment includes (i) one or more visual attributes or (ii) one or more audio attributes (710).

The system can continue execution of the process 700 by using one or more computers to provide the obtained data as an input to a machine learning model that has been trained to predict a likelihood that data representing features of a scene in a metaverse environment is indicative of offensive behavior (720).

The system can continue execution of the process 700 by using one or more computers to process the provided data representing features of a scene in a metaverse environment through each layer of the machine learning model to generate output data indicating a likelihood that the representing features of a scene in a metaverse environment is indicative of offensive behavior (730).

The system can continue execution of the process 700 by using one or more computers to determine whether the provided data representing features of a scene in a metaverse environment is indicative of offensive behavior based on the generated output data (740).

Then, based on a determination by the system that the provided data representing features of a scene in a metaverse is indicative of offensive behavior, the system can continue execution of the process 700 by using one or more computers to perform a remedial operation to mitigate exposure of one or more users to the offensive behavior 750.

In some implementations, performance at stage 750 of a remedial operation can include the system using one or more computers to determine a particular user in a metaverse scene that initiated the offensive behavior. Then, the system can continue execution of the process 700 by using one or more computers to generate notification data for transmission to a user device of the particular user that, when processed by the user device of the particular user, prompts the particular user to stop the offensive behavior. In some implementations, the notification data, when processed by the user device of the particular user, can cause the user device to display a visual notification in the display of the user device that prompts the particular user to stop the offensive behavior. Alternatively, or in addition, in some implementations, the notification data, when processed by the user device of the particular user, can cause the user device to output an audio notification from one or more speakers of the user device that prompts the particular user to stop the offensive behavior.

In some implementations, performance at stage 750 of a remedial operation can include after determining a particular user in a metaverse scene that initiated the offensive behavior, the system can continue execution of the process 700 by alternatively, or additionally, using one or more computers to mute audio from an avatar corresponding to the particular user in the metaverse environment.

In some implementations, performance at stage 750 of a remedial operation can include after determining a particular user in a metaverse scene that initiated the offensive behavior, the system can continue execution of the process 700 by alternatively, or additionally, using one or more computers to obfuscate a visual representation of an avatar corresponding to the particular user in the metaverse environment.

In some implementations, performance at stage 750 of a remedial operation can include after determining a particular user in a metaverse scene that initiated the offensive behavior, the system can continue execution of the process 700 by alternatively, or additionally, using one or more computers to remove a visual representation of an avatar corresponding to the particular user from the metaverse environment.

In some implementations, the machine learning model can include one or more neural networks.

FIG. 8 is a flowchart of an example of a process 800 for mitigating the spread of offensive messages comprising multi-modal content. For convenience, the process 800 will be described as being executed by a system such as the system of FIG. 5 of U.S. Pat. No. 10,250,538. U.S. Pat. No. 10,250,538 is herein incorporated by reference in its entirety.

A system can being execution of the process 800 by using one or more computers to obtain multi-modal message content data derived from input data input to a user device by a user, wherein the multi-modal message content data includes an image portion and a text portion (810).

The system can continue execution of the process 800 by using one or more computers to determine whether the multi-modal message content data is likely offensive content (820). In some implementations, the determining at stage 820 can include the system providing at least a portion of the received multi-modal message content data to a machine learning model that has been trained to detect a likelihood that multi-modal message content including an image portion and a text portion includes offensive content based on a combined meaning associated with the image portion and the text portion of the multi-modal message content. In such implementations, the determining at stage 820 can also include the system using one or more computers to obtain output data generated by the machine learning model based on the machine learning model processing the provided multi-modal message content data.

In response to a determination at stage 820, based on the obtained output data, that the multi-modal message content data is likely offensive content, the system can continue execution of the process 800 by using one or more computers to generate alert data that, when processed by the user device, causes the user device to present an indication that the multi-modal message content includes offensive content (830).

The system can continue execution of the process 800 by using one or more computers to provide the generated alert data to the user device (840).

In some implementations, the indication that the multi-modal message content includes offensive content presented by the user device can include a prompt that asks the user to confirm that the user device is to communicate the multi-modal message content that is likely offensive to another user device.

In some implementations, the indication that the multi-modal message content includes offensive content presented by the user device can include an audio message that provides information about strategies for managing offensive content. In some implementations, the audio message can include a song.

In some implementations, the indication that the multi-modal message content includes offensive content presented by the user device includes a video message that provides information about strategies for managing offensive content.

In some implementations, the machine learning model has further been trained to detect the likelihood that multi-modal message content includes offensive content based on the text portion including a plurality of consecutive capital letters.

In some implementations, the machine learning model has further been trained to detect the likelihood that multi-modal message content includes offensive content based on the text portion including a particular emoticon.

In some implementations, the machine learning model has further been trained to detect the likelihood that multi-modal message content includes offensive content based on the image portion including a particular subject.

In some implementations, the machine learning model has further been trained to detect the likelihood that multi-modal message content includes offensive content based on the text portion including an amount of negative emojis greater than a threshold. In some implementations, the amount of negative emojis is greater than the threshold when the percentage of the text portion composed of negative emojis is greater than the threshold.

In some implementations, the machine learning model has further been trained to detect the likelihood that multi-modal message content includes offensive content based on the text portion including text that indicates that the statement in the text portion is a joke.

Figure 9:
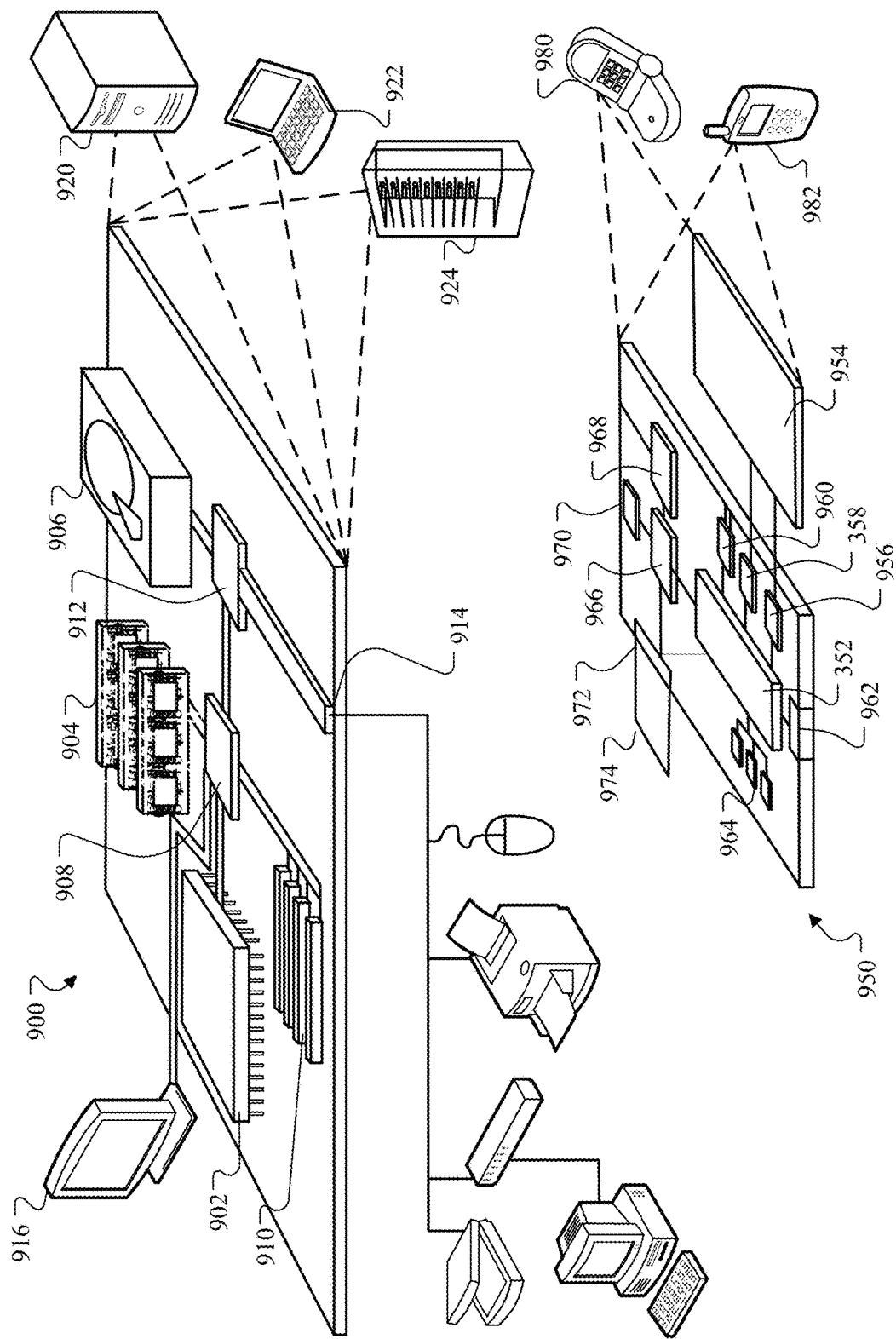
FIG. 9 is a diagram of system components that can be used in order to implement any of the systems described here.

FIG. 9 is a diagram of system components that can be used in order to implement any of the systems described here.

Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. Additionally, computing device 900 or 950 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and can be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses can be used, as appropriate, along with multiple memories and types of memory. Also, multiple computing devices 900 can be connected, with each device providing portions of the necessary operations, e.g., as a server bank, a group of blade servers, or a multi-processor system.

The memory 904 stores information within the computing device 900. In one implementation, the memory 904 is a volatile memory unit or units. In another implementation, the memory 904 is a non-volatile memory unit or units. The memory 904 can also be another form of computer-readable medium, such as a magnetic or optical disk.

The storage device 906 is capable of providing mass storage for the computing device 900. In one implementation, the storage device 906 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth intensive operations. Such allocation of functions is exemplary only. In one implementation, the high-speed controller 908 is coupled to memory 904, display 916, e.g., through a graphics processor or accelerator, and to high-speed expansion ports 910, which can accept various expansion cards (not shown). In the implementation, low-speed controller 912 is coupled to storage device 906 and low-speed expansion port 914. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 900 can be implemented in a number of different forms, as shown in the figure. For example, it can be implemented as a standard server 920, or multiple times in a group of such servers. It can also be implemented as part of a rack server system 924. In addition, it can be implemented in a personal computer such as a laptop computer 922. Alternatively, components from computing device 900 can be combined with other components in a mobile device (not shown), such as device 950. Each of such devices can contain one or more of computing device 900, 950, and an entire system can be made up of multiple computing devices 900, 950 communicating with each other.

The computing device 900 can be implemented in a number of different forms, as shown in the figure. For example, it can be implemented as a standard server 920, or multiple times in a group of such servers. It can also be implemented as part of a rack server system 924. In addition, it can be implemented in a personal computer such as a laptop computer 922. Alternatively, components from computing device 900 can be combined with other components in a mobile device (not shown), such as device 950. Each of such devices can contain one or more of computing device 900, 950, and an entire system can be made up of multiple computing devices 900, 950 communicating with each other.

Computing device 950 includes a processor 952, memory 964, and an input/output device such as a display 954, a communication interface 966, and a transceiver 968, among other components. The device 950 can also be provided with a storage device, such as a micro-drive or other device, to provide additional storage. Each of the components 950, 952, 964, 954, 966, and 968, are interconnected using various buses, and several of the components can be mounted on a common motherboard or in other manners as appropriate.

The processor 952 can execute instructions within the computing device 950, including instructions stored in the memory 964. The processor can be implemented as a chipset of chips that include separate and multiple analog and digital processors. Additionally, the processor can be implemented using any of a number of architectures. For example, the processor 910 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 950, such as control of user interfaces, applications run by device 950, and wireless communication by device 950.

Processor 952 can communicate with a user through control interface 958 and display interface 956 coupled to a display 954. The display 954 can be, for example, a TFT (Thin-Film-Transistor Liquid Crystal Display) display or an OLED (Organic Light Emitting Diode) display, or other appropriate display technology. The display interface 956 can comprise appropriate circuitry for driving the display 954 to present graphical and other information to a user. The control interface 958 can receive commands from a user and convert them for submission to the processor 952. In addition, an external interface 962 can be provide in communication with processor 952, so as to enable near area communication of device 950 with other devices. External interface 962 can provide, for example, for wired communication in some implementations, or for wireless communication in other implementations, and multiple interfaces can also be used.

The memory 964 stores information within the computing device 950. The memory 964 can be implemented as one or more of a computer-readable medium or media, a volatile memory unit or units, or a non-volatile memory unit or units. Expansion memory 974 can also be provided and connected to device 950 through expansion interface 972, which can include, for example, a SIMM (Single In Line Memory Module) card interface. Such expansion memory 974 can provide extra storage space for device 950, or can also store applications or other information for device 950. Specifically, expansion memory 974 can include instructions to carry out or supplement the processes described above, and can include secure information also. Thus, for example, expansion memory 974 can be provide as a security module for device 950, and can be programmed with instructions that permit secure use of device 950. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952 that can be received, for example, over transceiver 968 or external interface 962.

Device 950 can communicate wirelessly through communication interface 966, which can include digital signal processing circuitry where necessary. Communication interface 966 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 968. In addition, short-range communication can occur, such as using a Bluetooth, Wi-Fi, or other such transceiver (not shown). In addition, GPS (Global Positioning System) receiver module 970 can provide additional navigation- and location-related wireless data to device 950, which can be used as appropriate by applications running on device 950.

Device 950 can also communicate audibly using audio codec 960, which can receive spoken information from a user and convert it to usable digital information. Audio codec 960 can likewise generate audible sound for a user, such as through a speaker, e.g., in a handset of device 950. Such sound can include sound from voice telephone calls, can include recorded sound, e.g., voice messages, music files, etc. and can also include sound generated by applications operating on device 950.

The computing device 950 can be implemented in a number of different forms, as shown in the figure. For example, it can be implemented as a cellular telephone 980. It can also be implemented as part of a smartphone 982, personal digital assistant, or other similar mobile device.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A method for identifying and deleting offensive message content shared using an application comprising:
   obtaining, by one or more computer, content of a responsive message that is received, by the one or more computer, after an initial message provided by a user device, wherein the responsive message includes content that is a response to content of the initial message;
   providing, by the one or more computer, content of the responsive message as an input to a machine learning model that has been trained to predict a likelihood that an initial message includes offensive content based on processing of responsive message content from a message that was provided in response to the initial message;
   processing, by the one or more computer, the obtained content of the responsive message through the machine learning model to generate output data indicating a likelihood that the initial message includes offensive content;
   determining, by the one or more computer and based on the generated output data, whether the initial message likely includes offensive content; and
   based on a determination, by the one or more computer, that the generated output data indicates that the initial message likely includes offensive content:
   generating, by the one or more computer, notification data that, when processed by the user device, causes the user device to display a plurality of selectable options, wherein the plurality of selectable options includes a first selectable option prompting the user to delete the initial message and a second selectable option prompting the user to not delete the initial message;
   transmitting, by the one or more computer, to the generated notification data to the user device;
   receiving, by the one or more computer, data corresponding to a selection of the first selectable option; and
   in response to receiving data corresponding to a selection of the first selectable option, deleting, by the one or more computer, the initial message, wherein deleting the initial message prevents further viewing of the initial message using the application.

2. The method of claim 1, wherein determining, by one or more computer and based on the generated output data, whether the initial message likely includes offensive content comprises:
   determining, by one or more computer, whether the particular instance of output data satisfies a predetermined threshold.

3. The method of claim 1, wherein the machine learning model comprises one or more neural networks.

4. The method of claim 1, wherein the application is a social media application, and
   wherein the initial message is a social media post and the responsive message is a comment submitted in association with the social media post by another user of another user device.

5. The method of claim 1, wherein the application is a messaging application, and
   wherein the initial message is a message in a messaging application and the responsive message is a message in the messaging application submitted by another user of another user device.

6. The method of claim 1, wherein the responsive message comprises one or more of textual data, image data, video data, audio data, a dislike, an emoji, or a tapback indication.

7. The method of claim 2, the method further comprising:
   based on a determination that the generated output data indicates that the initial message likely does not include offensive content:
   determining, by the one or more computer, to not generate notification data that, when processed by the user device, causes the user device to display a plurality of selectable options, wherein the plurality of selectable options includes a first selectable option prompting the user to delete the initial message and a second selectable option prompting the user to not delete the initial message.

8. The method of claim 7, wherein the determination, by one or more computer, that the generated output data indicates that the initial message likely includes offensive content comprises a determination, by one or more computer, that the particular instance of output data satisfies the predetermined threshold.

9. A system for identifying and deleting offensive message content shared using an application comprising:
one or more computer; and
one or more computer-readable storage devices storing instructions that, when executed by the one or more computer, cause the one or more computer to perform operations, the operations comprising:
obtaining, by the one or more computer, content of a responsive message that is received, by the one or more computer, after an initial message provided by a user device, wherein the responsive message includes content that is a response to content of the initial message;
providing, by the one or more computer, content of the responsive message as an input to a machine learning model that has been trained to predict a likelihood that an initial message includes offensive content based on processing of responsive message content from a message that was provided in response to the initial message;
processing, by the one or more computer, the obtained content of the responsive message through the machine learning model to generate output data indicating a likelihood that the initial message includes offensive content;
determining, by the one or more computer and based on the generated output data, whether the initial message likely includes offensive content; and
based on a determination, by the one or more computer, that the generated output data indicates that the initial message likely includes offensive content:
generating, by the one or more computer, notification data that, when processed by the user device, causes the user device to display a plurality of selectable options, wherein the plurality of selectable options includes a first selectable option prompting the user to delete the initial message and a second selectable option prompting the user to not delete the initial message;
transmitting, by the one or more computer, the generated notification data to the user device;
receiving, by the one or more computer, data corresponding to a selection of the first selectable option; and
in response to receiving data corresponding to a selection of the first selectable option, deleting, by the one or more computer, the initial message wherein deleting the initial message prevents further viewing of the initial message using the application.

10. The system of claim 9, wherein determining, by the one or more computer and based on the generated output data, whether the initial message likely includes offensive content comprises:
determining, by the one or more computer, whether the particular instance of output data satisfies a predetermined threshold.

11. The system of claim 9,
wherein the application is a social media application, and
wherein the initial message is a social media post and the responsive message is a comment submitted in association with the social media post by another user of another user device.

12. The system of claim 9,
wherein the application is a messaging application, and
wherein the initial message is a message in a messaging application and the responsive message is a message in the messaging application submitted by another user of another user device.

13. The system of claim 9, wherein the responsive message comprises one or more of textual data, image data, video data, audio data, a dislike, an emoji, or a tapback indication.

14. The system of claim 9, wherein the machine learning model comprises one or more neural networks.

15. The system of claim 9, the operations further comprising:
based on a determination, by the one or more computer, that the generated output data indicates that the initial message likely does not include offensive content:
determining, by the one or more computer, to not generate notification data that, when processed by the user device, causes the user device to display a plurality of selectable options, wherein the plurality of selectable options includes a first selectable option prompting the user to delete the initial message and a second selectable option prompting the user to not delete the initial message.

16. The system of claim 15, wherein the determination, by the one or more computer, that the generated output data indicates that the initial message likely includes offensive content comprises a determination, by one or more computer, that the particular instance of output data satisfies the predetermined threshold.

17. One or more computer readable-storage media storing instructions that, when executed by the one or more computer, cause the one or more computer to perform operations for identifying and deleting offensive message content shared using an application, the operations comprising:
obtaining content of a responsive message that is received, by the one or more computer, after an initial message provided by a user device, wherein the responsive message includes content that is a response to content of the initial message;
providing content of the responsive message as an input to a machine learning model that has been trained to predict a likelihood that an initial message includes offensive content based on processing of responsive message content from a message that was provided in response to the initial message;
processing the obtained content of the responsive message through the machine learning model to generate output data indicating a likelihood that the initial message includes offensive content;
determining, based on the generated output data, whether the initial message likely includes offensive content; and
based on a determination that the generated output data indicates that the initial message likely includes offensive content:
generating notification data that, when processed by the user device, causes the user device to display a plurality of selectable options, wherein the plurality of selectable options includes a first selectable option prompting the user to delete the initial message and a second selectable option prompting the user to not delete the initial message;

transmitting to the generated notification data to the user device;

receiving data corresponding to a selection of the first selectable option; and in response to receiving data corresponding to a selection of the first selectable option, deleting the initial message, wherein deleting the initial message prevents further viewing of the initial message using the application.

18. The one or more computer readable-storage media of claim 17, the operations further comprising:

based on a determination that the generated output data indicates that the initial message likely does not include offensive content:

determining, by the one or more computer, to not generate notification data that, when processed by the user device, causes the user device to display a plurality of selectable options, wherein the plurality of selectable options includes a first selectable option prompting the user to delete the initial message and a second selectable option prompting the user to not delete the initial message.

19. The one or more computer-readable storage media of claim 17, wherein the application is a social media application, and wherein the initial message is a social media post and the responsive message is a comment submitted in association with the social media post by another user of another user device.

20. The one or more computer-readable storage media of claim 17, wherein the application is a messaging application, and wherein the initial message is a message in a messaging application and the responsive message is a message in the messaging application submitted by another user of another user device.

* * * * *